(12) United States Patent
Sugiura et al.

(10) Patent No.: US 8,795,898 B2
(45) Date of Patent: Aug. 5, 2014

(54) PLATE-LIKE PARTICLE FOR CATHODE ACTIVE MATERIAL OF A LITHIUM SECONDARY BATTERY, A CATHODE ACTIVE MATERIAL FILM OF A LITHIUM SECONDARY BATTERY, AND A LITHIUM SECONDARY BATTERY

(75) Inventors: Ryuta Sugiura, Nagoya (JP); Nobuyuki Kobayashi, Nagoya (JP); Shohei Yokoyama, Nagoya (JP); Tsutomu Nanataki, Toyoake (JP)

(73) Assignee: NGK Insulators, Ltd., Nagoya (JP)

( * ) Notice: Subject to any disclaimer, the term of this patent is extended or adjusted under 35 U.S.C. 154(b) by 419 days.

(21) Appl. No.: 12/644,394

(22) Filed: Dec. 22, 2009

(65) Prior Publication Data

US 2010/0159330 A1   Jun. 24, 2010

Related U.S. Application Data

(60) Provisional application No. 61/236,591, filed on Aug. 25, 2009, provisional application No. 61/251,783, filed on Oct. 15, 2009.

(30) Foreign Application Priority Data

| Dec. 24, 2008 | (JP) | ................................ | 2008-326997 |
| Mar. 17, 2009 | (JP) | ................................ | 2009-64862 |
| Jun. 10, 2009 | (JP) | ................................ | 2009-138984 |
| Aug. 21, 2009 | (JP) | ................................ | 2009-191680 |
| Oct. 9, 2009 | (JP) | ................................ | 2009-235090 |

(51) Int. Cl.
*H01M 4/13* (2010.01)
*H01M 4/58* (2010.01)
*H01M 4/02* (2006.01)

(52) U.S. Cl.
USPC ...................................... 429/231.4; 429/209

(58) Field of Classification Search
USPC .......................... 429/594.6, 594.5, 231.4, 209
See application file for complete search history.

(56) References Cited

U.S. PATENT DOCUMENTS

| 5,503,930 | A | 4/1996 | Maruyama et al. |
| 6,306,542 | B1 * | 10/2001 | Nakano et al. ................ 429/224 |

(Continued)

FOREIGN PATENT DOCUMENTS

| CN | 1284756 | 2/2001 |
| CN | 1741302 A | 3/2006 |

(Continued)

OTHER PUBLICATIONS

U.S. Appl. No. 12/644,337, filed Dec. 22, 2009, Sugiura et al.

(Continued)

*Primary Examiner* — Roy King
*Assistant Examiner* — Jenny Wu
(74) *Attorney, Agent, or Firm* — Burr & Brown, PLLC

(57) ABSTRACT

An object of the present invention is to provide a lithium secondary battery which has improved capacity, durability, and the other characteristic as compared with conventional lithium secondary batteries. A plate-like particle or a film for a lithium secondary battery cathode active material has a layered rock salt structure. The lithium ion gateway plane is oriented in parallel with a plate surface, which is a surface orthogonal to a thickness direction of the particle and thus exposed at the plate surface, a plurality of layers are stacked together in the thickness direction, and while the layers have the same crystal axis in the thickness direction, as for the plate surface direction perpendicular to the thickness direction, the layers have different crystal axes.

8 Claims, 10 Drawing Sheets

(56) References Cited

U.S. PATENT DOCUMENTS

| | | | |
|---|---|---|---|
| 2003/0118906 A1* | 6/2003 | Bowden et al. | 429/224 |
| 2005/0014065 A1 | 1/2005 | Jung et al. | |
| 2005/0142442 A1 | 6/2005 | Yuasa et al. | |
| 2005/0142444 A1 | 6/2005 | Nagashima | |
| 2005/0233219 A1* | 10/2005 | Gozdz et al. | 429/231.95 |
| 2006/0216600 A1 | 9/2006 | Inagaki et al. | |
| 2007/0072086 A1 | 3/2007 | Nakagawa | |
| 2008/0268347 A1 | 10/2008 | Ohzuku et al. | |

FOREIGN PATENT DOCUMENTS

| | | | |
|---|---|---|---|
| CN | 1788370 A | | 6/2006 |
| CN | 1934728 | | 3/2007 |
| EP | 0 672 622 | | 9/1995 |
| EP | 1 972 604 | | 9/2008 |
| EP | 1972604 A1 | * | 9/2008 |
| EP | 2 071 650 A1 | | 6/2009 |
| EP | 1 825 545 B1 | | 11/2009 |
| JP | 03-272564 A1 | | 12/1991 |
| JP | 08-055624 A1 | | 2/1996 |
| JP | 2000-200624 | | 7/2000 |
| JP | 2000-260479 A1 | | 9/2000 |
| JP | 2000260479 A | * | 9/2000 |
| JP | 2000-294242 A1 | | 10/2000 |
| JP | 2001-006671 | | 1/2001 |
| JP | 2001-052703 A1 | | 2/2001 |
| JP | 2001-297761 A1 | | 10/2001 |
| JP | 2001-351687 A1 | | 12/2001 |
| JP | 2002-279985 A1 | | 9/2002 |
| JP | 2002-324544 A1 | | 11/2002 |
| JP | 2003-002653 | | 1/2003 |
| JP | 2003-132887 A1 | | 5/2003 |
| JP | 2004-311427 A1 | | 11/2004 |
| JP | 2005-053764 | | 3/2005 |
| JP | 2005-197004 A1 | | 7/2005 |
| JP | 2005197004 A | * | 7/2005 |
| JP | 2006-012576 A1 | | 1/2006 |
| JP | 2006-210007 A1 | | 8/2006 |
| JP | 2007-087909 A1 | | 4/2007 |
| JP | 2007-179917 A1 | | 7/2007 |
| JP | 2007-214118 A1 | | 8/2007 |
| JP | 2008-523567 A1 | | 3/2008 |
| JP | 2008-124038 | | 5/2008 |
| JP | 2008-258160 A1 | | 10/2008 |
| JP | 2009-295514 A1 | | 12/2009 |
| JP | 2009-301850 A1 | | 12/2009 |
| WO | 01/20696 | | 3/2001 |
| WO | 03/088382 A1 | | 10/2003 |
| WO | 2004/102700 A1 | | 11/2004 |

OTHER PUBLICATIONS

U.S. Appl. No. 12/644,356, filed Dec. 22, 2009, Sugiura et al.
U.S. Appl. No. 12/644,369, filed Dec. 22, 2009, Sugiura et al.
U.S. Appl. No. 12/644,381, filed Dec. 22, 2009, Sugiura et al.
U.S. Appl. No. 12/644,405, filed Dec. 22, 2009, Sugiura et al.
U.S. Appl. No. 12/644,423, filed Dec. 22, 2009, Sugiura et al.
P.J. Bouwman, et al., "*Influence of Diffusion Plane Orientation on Electrochemical Properties of Thin Film LiCoO$_2$ Electrodes,*" Journal of the Electrochemical Society, vol. 149(6), Apr. 12, 2002, pp. A699-A709.
Jian Xie, et al., "*Orientation Dependence of Li-Ion Diffusion Kinetics in LiCoO$_2$ Thin Films Prepared by RF Magnetron Sputtering,*" Solid State Ionics, Science Direct, vol. 179, May 15, 2008, pp. 362-370.
Xie., J. et. al., "*Kinetics Investigation of preferential (104) Plane Oriented LiCoO$_2$ Thin Film Prepared by RF Magnetron Sputtering,*" ScienceDirect, vol. 178, No. 19-20, Aug. 7, 2007, pp. 1218-1224 (7 pages).
Guilmard, M., "*Structural and Electrochemical Properties of LiNi$_{0.70}$Co$_{0.15}$Al$_{0.15}$O$_2$,*" ScienceDirect, vol. 160, No. 1-2, May 1, 2003, pp. 39-50 (12 pages).
European Search Report, European Patent Application No. 09835094.5, dated Oct. 22, 2013 (10 pages).
European Search Report, European Patent Application No. 09835103.4, dated Oct. 22, 2013 (8 pages).
European Search Report, European Patent Application No. 09835088.7, dated Oct. 22, 2013 (8 pages).
Chinese Search Report, With English Translation, Chinese Patent Application No. 200980149111.6, dated Oct. 30, 2013 (27 pages).
Chinese Office Action mailed Jan. 25, 2013 (with partial English translation).
Chinese Office Action dated Mar. 13, 2013 (with English translation) for CN 200980139572.5.
Chinese Office Action dated Apr. 26, 2013 (with English translation) for CN 200980149111.6.

\* cited by examiner

500nm 15a 15b

15a1(15a) 15b 15a2(15a)

PLATE-LIKE PARTICLE FOR CATHODE ACTIVE MATERIAL OF A LITHIUM SECONDARY BATTERY, A CATHODE ACTIVE MATERIAL FILM OF A LITHIUM SECONDARY BATTERY, AND A LITHIUM SECONDARY BATTERY

BACKGROUND OF THE INVENTION

The present invention relates to a plate-like particle for cathode active material having a layered rock salt structure for a lithium secondary battery and a cathode active material film (the distinction between a film and particles will be described later). Further, the present invention relates to a lithium secondary battery having a positive electrode which includes the above-mentioned plate-like particle or film.

DESCRIPTION OF RELATED ART

A cobalt-based cathode active material is widely used as a material for producing a positive electrode of a lithium secondary battery (may be referred to as a lithium ion secondary cell). The cobalt-based cathode active material (typically, $LiCoO_2$) has a so-called $\alpha$-$NaFeO_2$ type layered rock salt structure. In the cobalt-based cathode active material, intercalation and deintercalation of lithium ions ($Li^+$) occur through a crystal plane other than the (003) plane (e.g., the (101) plane or the (104) plane). Through such intercalation and deintercalation of lithium ions, charge and discharge are carried out.

SUMMARY OF THE INVENTION

A cathode active material of this kind for a cell brings about improvement in cell capacity by means of exposure of the crystal plane through which lithium ions are favorably intercalated and deintercalated (the plane other than the (003) plane; for example, the (101) plane- or the (104) plane) as much extent as possible to an electrolyte. Demand exists not only for merely improving capacity, but also for improving as many characteristics as possible, such as durability and rate characteristic.

The present invention has been conceived to solve such a problem. That is, an object of the present invention is to provide a lithium secondary battery which has improved capacity, durability, and other characteristics as compared with a conventional lithium secondary battery.

The plate-like particle for cathode active material for a lithium secondary battery according to the present invention has a layered rock salt structure and is formed so as to have a crystal plane through which lithium ions are favorably intercalated and deintercalated (hereinafter, referred to as "lithium ion gateway plane") oriented in parallel with the plate surface of the particle (the definition of the plate surface will be described later) and thus exposed at the plate surface. The particle can be formed to a thickness of 100 μm or less (e.g., 20 μm or less).

As mentioned above, "lithium ion gateway plane" refers to a crystal plane through which lithium ions are favorably intercalated and deintercalated, and, for example, the (101) plane, the (104) plane and the like correspond thereto. That is, the plate-like particle for cathode active material for a lithium secondary battery according to the present invention is formed such as a plane other than the (003) plane (e.g., (104) plane) is oriented in parallel with the plate surface.

"Layered rock salt structure" refers to a crystal structure in which lithium layers and layers of a transition metal other than lithium are arranged in alternating layers with an oxygen layer therebetween; i.e., a crystal structure in which transition metal ion layers and lithium layers are arranged in alternating layers via oxide ions (typically, $\alpha$-$NaFeO_2$ type structure: structure in which a transition metal and lithium are arrayed orderly in the direction of the [111] axis of cubic rock salt type structure). "The (104) plane is oriented in parallel with the plate surface" can be rephrased as: the (104) plane is oriented such that the axis, which is normal to the (104) plane, is in parallel with the direction of the normal to the plate surface.

The above-mentioned characteristic can be rephrased as: in the plate-like particle for a lithium secondary battery cathode active material of the present invention, the [003] axis in the layered rock salt structure is in a direction which intersects the normal to the plate surface of the particle. That is, the particle is formed such that a crystal axis (e.g., the [104] axis) which intersects the [003] axis is in a direction orthogonal to the plate surface.

"Plate-like particle" refers to a particle whose external shape is plate-like. The concept of "plate-like" is apparent under social convention without need of particular description thereof in the present specification. However, if the description were to be added, "plate-like" would be defined, for example, as follows.

Namely, "plate-like" refers to a state in which, when a particle which is placed on a horizontal surface (a surface orthogonal to the vertical direction, along which gravity acts) stably (in a manner as not to further fall down even upon subjection to an external impact (excluding such a strong impact as to cause the particle to fly away from the horizontal surface)) is cut by a first plane and a second plane which are orthogonal to the horizontal surface (the first plane and the second plane intersect each other, typically at right angles), and the sections of the particle are observed, a dimension along the width direction (the dimension is referred to as the "width" of the particle), which is along the horizontal surface (in parallel with the horizontal surface or at an angle of $\alpha$ degrees ($0<\alpha<45$) with respect to the horizontal surface), is greater than a dimension along the thickness direction (the dimension is referred to as the "thickness" of the particle), which is orthogonal to the width direction. The above-mentioned "thickness" does not include a gap between the horizontal surface and the particle.

The plate-like particle of the present invention is usually formed in a flat plate-like form. "Flat plate-like form" refers to a state in which, when a particle is placed stably on a horizontal surface, the height of a gap formed between the horizontal surface and the particle is less than the thickness of the particle. Since a plate-like particle of this kind is not usually curved to an extent greater than the state, the above-mentioned definition is appropriate for the plate-like particle of the present invention.

In a state in which a particle is placed stably on a horizontal surface, the thickness direction is not necessarily parallel with the vertical direction. This will be discussed under the assumption that the sectional shape of particle placed stably on a horizontal surface, as cut by the first plane or the second plane, should be classified into the closest one among (1) rectangular shape, (2) diamond shape, and (3) elliptic shape. When the sectional shape of the particle is close to (1) rectangular shape, the width direction is parallel with the horizontal surface in the above-mentioned state, and the thickness direction is parallel with the vertical direction in the above-mentioned state.

Meanwhile, when the sectional shape of the particle is (2) diamond shape or (3) elliptic shape, the width direction may form some angle (45 degrees or less; typically, about a few degrees to about 20 degrees) with respect to the horizontal surface. In this case, the width direction is a direction which connects the two most distant points on the outline of the section (this definition is not appropriate for the case of (1) rectangular shape, since the direction according thereto is along a diagonal of the rectangular shape).

The "plate surface" of a particle refers to a surface which faces, in a state in which the particle is placed stably on a horizontal surface, the horizontal surface, or a surface which faces an imaginary plane located above the particle as viewed from the horizontal surface and being parallel with the horizontal surface. Since the "plate surface" of a particle is the widest surface on the plate-like particle, the "plate surface" may be referred to as the "principal surface." A surface which intersects (typically, at right angles) the plate surface (principal surface); i.e., a surface which intersects the plate surface direction (or in-plane direction), which is perpendicular to the thickness direction, is referred to as an "end surface," since the surface arises at an edge when the particle in a state of being stably placed on the horizontal surface is viewed in plane (when the particle in a state of being stably placed on the horizontal surface is viewed from above with respect to the vertical direction).

Nevertheless, in many cases, the plate-like particle for a lithium secondary battery cathode active material of the present invention is formed such that the sectional shape of the particle is close to (1) rectangular shape. Thus, in the plate-like particle for a lithium secondary battery cathode active material of the present invention, the thickness direction may be said to be parallel with the vertical direction in a state in which the particle is placed stably on a horizontal surface. Similarly, in the plate-like particle for a lithium secondary battery cathode active material of the present invention, the "plate surface" of the particle may be said to be a surface orthogonal to the thickness direction.

The lithium secondary battery of the present invention includes a positive electrode which contains, as a cathode active material, the plate-like particles for cathode active material of the present invention; a negative electrode which contains, as an anode active material, a carbonaceous material or a lithium-occluding material; and an electrolyte provided so as to intervene between the positive electrode and the negative electrode.

In formation of a positive electrode of a lithium secondary battery, for example, the plate-like particles for cathode active material are dispersed in a binder so as to form a cathode active material layer. A laminate of the cathode active material layer and a predetermined cathode collector serves as the positive electrode. That is, in this case, the positive electrode is formed by stacking the cathode active material layer, which contains the plate-like particles, on the cathode collector.

The cathode active material film for a lithium secondary battery according to the present invention has a layered rock salt structure and is formed so as to have a lithium ion gateway plane oriented in parallel with the plate surface of the film (the definition of the plate surface of the film will be described later) and thus exposed at the plate surface. That is, the cathode active material film for a lithium secondary battery according to the present invention is formed such as a plane other than the (003) plane (e.g., (104) plane) is oriented in parallel with the plate surface. The film may be formed to a thickness of 100 μm or less (e.g., 20 μm or less).

The above-mentioned characteristic can be rephrased as: in the cathode active material film for a lithium secondary battery of the present invention, the axis in the layered rock salt structure is oriented in a direction which intersects the normal to the plate surface of the film. That is, the particle is formed such that a crystal axis (e.g., the [104] axis) which intersects the [003] axis is oriented in a direction orthogonal to the plate surface.

The "thickness direction" of a film refers to a direction parallel with the vertical direction in a state in which the film is placed stably on a horizontal surface (a dimension of the film along the direction is referred to as "thickness"). The "plate surface" of a film refers to a surface orthogonal to the thickness direction of the film. Since the "plate surface" of the film is the widest surface on the film, the "plate surface" may be referred to as the "principal surface." A surface which intersects (typically, at right angles) the plate surface (principal surface); i.e., a surface which intersects the plate surface direction (or in-plane direction), which is perpendicular to the thickness direction, is referred to as an "end surface," since the surface arises at an edge when the film in a state of being stably placed on the horizontal surface is viewed in plane (when the film in a state of being stably placed on the horizontal surface is viewed from above with respect to the vertical direction). The above-mentioned "thickness" does not include a gap between the horizontal surface and the particle.

The cathode active material film of the present invention is usually formed flat. "Flat" refers to a state in which, when a film is placed stably on a horizontal surface, the height of a gap formed between the horizontal surface and the film is less than the thickness of the film. Since a cathode active material film of this kind is not usually curved to an extent greater than the state, the above-mentioned definition is appropriate for the cathode active material film of the present invention.

The lithium secondary battery of the present invention includes a positive electrode which includes the cathode active material film of the present invention; a negative electrode which contains a carbonaceous material or a lithium-occluding material as an anode active material; and an electrolyte provided so as to intervene between the positive electrode and the negative electrode.

In formation of the positive electrode of a lithium secondary battery, for example, a laminate of the cathode active material film and a predetermined cathode collector (for example, a laminate formed by laminating the cathode active material film and an electric conductor film together through vapor deposition (e.g., sputtering), application, or the like) serves as the positive electrode. In this case, the cathode collector may be provided on at least one of the two plate surfaces of the cathode active material film. That is, the cathode collector may be provided on only one of the two plate surfaces of the cathode active material film. Alternatively, the cathode collector may be provided on both surfaces (both of the two plate surfaces) of the cathode active material film. When the cathode collector is provided on each of both surfaces of the cathode active material film, one of them may be formed thicker than the other in order to support the cathode active material film, and the other may be formed so as to have a structure (mesh-like, porous or the like) such that it does not inhibit the intercalation and deintercalation of lithium ions in the cathode active material film.

As mentioned above, in formation of the positive electrode, the "plate-like particles for cathode active material" in the present invention can be dispersed in the cathode active material layer. Meanwhile, the "cathode active material film" in the present invention is a self-standing film (a film which can be handled by itself after formation) which can form the positive electrode through lamination to the cathode collector. As in the case of examples to be described later, the film may be crushed into fine particles (the resultant particles correspond to the "plate-like particles for cathode active material" in the present invention), followed by dispersion in the cathode active material layer. In this way, the distinction between "particles" and "film" is apparent to those skilled in the art in association with modes of application to formation of the positive electrode.

The present invention is characterized in that, in the above-mentioned plate-like particle for cathode active material and cathode active material film, a plurality of layers are stacked together in the thickness direction, and each of the layers has the same crystal axis in the thickness direction but has different crystal axes in the plate surface direction perpendicular to the thickness direction.

Specifically, each of the layers has the same crystal axis [hkl] in the plate surface. Meanwhile, as for the plate surface direction (in-plane direction) perpendicular to the thickness direction, the [h'k'l'] axes are oriented in a plurality of (various; i.e., random) directions. In other words, the layer is in a state in which, as viewed in plane, a large number of regions are arrayed two-dimensionally, the [h'k'l'] axis is oriented in the same direction in each region, and the adjacent regions differ in direction in which the [h'k'l'] axes are oriented.

That is, the layer is formed such that so-called "uniaxial orientation" is attained. Specifically, the layer is formed such that the [h'k'l'] axes different from a [hkl] axis which is a crystal axis parallel with the thickness direction are oriented in a plurality of directions. In this case, in the plate-like particle or the cathode active material film, the [hkl] and [h'k'l'] axes are present such that, while the [hkl] axis (e.g., the [104] axis) is oriented in a fixed direction (in the thickness direction) at all times, the [h'k'l'] axes (e.g., the [003] axes) are oriented in such a manner as to revolve about the [hkl] axis.

Such a structure can be confirmed by means of an X-ray diffractometer, a transmission electron microscope, or the like. For example, such a structure can be confirmed by means of X-ray diffraction as follows: In the case of (104) plane orientation, a diffraction pattern from (104) plane appearing on a pole figure is spot-like, while a diffraction pattern from the other plane (e.g., the (003) plane) plane appear ring-like.

In the plate-like particle for cathode active material and cathode active material film according to the present invention, a plurality of layers having the above-mentioned configuration are stacked together in the thickness direction (the layers differ in the above-mentioned [hkl] axis).

Regarding the degree of orientation, preferably, the ratio of intensity of diffraction by the (003) plane to intensity of diffraction by the (104) plane, [003]/[104], as obtained by X-ray diffraction is 1 or less. Thus, the deintercalation of lithium ions is facilitated, resulting in a remarkable improvement in charge-discharge characteristics.

However, when the ratio [003]/[104] is less than 0.005, the cycle characteristic deteriorates. Conceivably, this is because, when the degree of orientation is excessively high (i.e., crystals are oriented to an excessively high degree), a change in the volume of crystal associated with intercalation and deintercalation of lithium ions causes the particles and the film to be apt to break (the specifics of the reason for the deterioration in cycle characteristic are not clear).

Further, each of the layers may be formed as a configuration in which crystallites having the same crystal axis as for the thickness direction are densely joined together in the plate surface directions, and thus the plate-like particle for cathode active material and the cathode active material film according to the present invention may be formed to be dense (e.g., with a porosity of 10% or less). Specifically, porosity falls preferably within a range of 3 to 10%. Porosity less than 3% is unpreferable for the following reason: due to the volume expansion-contraction associated with charge-discharge, concentration of stress occurs at a boundary between the domains whose crystal orientations are different in the particle or the film. This causes cracking then capacity is apt to be low. On the other hand, porosity more than 10% is unpreferable because charge-discharge capacity per volume decreases.

In the plate-like particle for cathode active material and the cathode active material film according to the present invention, the lithium ion gateway plane, which is a plane other than the (003) plane, is oriented in parallel with a plate surface, and thus exposed at the plate surface. Thereby, the lithium ion gateway plane (a plane other than the (003) plane: e.g., (101) plane and (104) plane), through which lithium ions are favorably intercalated and deintercalated, exposes more to an electrolyte.

In the plate-like particle for cathode active material and the cathode active material film having a layered rock salt structure, the intercalation and deintercalation of lithium ions associated with charging and discharging causes a change in the volume thereof. It is known that the occurrence of cracking in the particle and the film may be caused in the course of charge-discharge cycles.

In this connection, since the plate-like particle for cathode active material and the cathode active material film according to the present invention are plate-like and the lithium ion gateway plane is oriented in the plate surface, the direction of the crystal deformation associated with the intercalation and deintercalation of lithium ions is along the plate surface. Therefore, it can be concerned that the occurrence of cracking with the (003) plane as a cleavage plane may become more likely.

However, in the plate-like particle for cathode active material and the cathode active material film according to the present invention, the layers having the same crystal axis as for the thickness direction and meanwhile having different crystal axes in the plate surface direction perpendicular to the thickness direction are stacked together in the thickness direction. That is, the plate-like particle for cathode active material and the cathode active material film according to the present invention have an internal structure wherein domains (regions) having a singular crystal axis are stacked together.

Thus, there is effectively restrained the occurrence of cracking in the particle and the film. The detailed reason for this has not been rendered clear, but is assumed that internal stress occurred on the volume expansion-contraction associated with charge-discharge cycles will be relieved at a boundary between the domains. Particularly, at a relatively large thickness (e.g., 2 µm to 100 µm, preferably 5 µm to 50 µm, more preferably 5 µm to 20 µm), the effect of restraining the occurrence of cracking is of particular note. In addition, when the layers are formed as a configuration in which crystallites having the same crystal direction as for the thickness direction are densely joined together in the plate surface directions, cracking is more effectively restrained.

As mentioned above, the plate-like particle for cathode active material and the cathode active material film according to the present invention can improve charge-discharge characteristics by means of orientation as well as durability and cycle characteristic. Thus, the present invention can provide a lithium secondary battery whose capacity, durability, and other characteristics are improved as compared with those of a conventional lithium secondary battery.

DETAILED DESCRIPTION OF THE INVENTION

Preferred embodiments of the present invention will next be described by use of examples and comparative examples. The following description of the embodiments is nothing more than the specific description of mere example embodiments of the present invention to the possible extent in order to fulfill description requirements (descriptive requirement and enabling requirement) of specifications required by law. Thus, as will be described later, naturally, the present invention is not limited to the specific configurations of embodiments and examples to be described below. Modifications that can be made to the embodiments and examples are collectively described herein principally at the end, since insertion thereof into the description of the embodiments would disturb understanding of consistent description of the embodiments.

<Configuration Example 1 of Lithium Secondary Battery: Liquid Type>

Figure 1A:
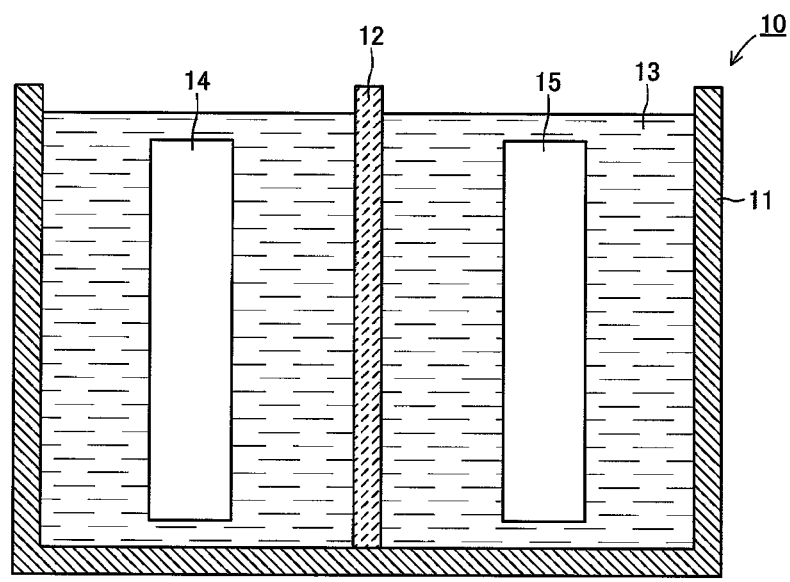
FIG. 1A is a sectional view of the schematic configuration of a lithium secondary battery according to an embodiment of the present invention.

FIG. 1A is a sectional view of the schematic configuration of a lithium secondary battery 10 according to an embodiment of the present invention.

Referring to FIG. 1A, the lithium secondary battery 10 of the present embodiment is of a so-called liquid type and includes a cell casing 11, a separator 12, an electrolyte 13, a negative electrode 14, and a positive electrode 15.

The separator 12 is provided so as to halve the interior of the cell casing 11. The cell casing 11 accommodates the liquid electrolyte 13. The negative electrode 14 and the positive electrode 15 are provided within the cell casing 11 in such a manner as to face each other with the separator 12 located therebetween.

For example, a nonaqueous-solvent-based electrolytic solution prepared by dissolving an electrolyte salt, such as a lithium salt, in a nonaqueous solvent, such as an organic solvent, is preferably used as the electrolyte 13, in view of electrical characteristics and easy handleability. However, a polymer electrolyte, a gel electrolyte, an organic solid electrolyte, or an inorganic solid electrolyte can also be used as the electrolyte 13 without problems.

No particular limitation is imposed on a solvent for a nonaqueous electrolytic solution. Examples of the solvent include chain esters, such as dimethyl carbonate, diethyl carbonate, ethyl methyl carbonate, and methyl propione carbonate; cyclic esters having high dielectric constant, such as ethylene carbonate, propylene carbonate, butylene carbonate, and vinylene carbonate; and mixed solvents of a chain ester and a cyclic ester. A mixed solvent containing a chain ester serving as a main solvent with a cyclic ester is particularly suitable.

In preparation of a nonaqueous electrolytic solution, examples of an electrolyte salt to be dissolved in the above-mentioned solvent include $LiClO_4$, $LiPF_6$, $LiBF_4$, $LiAsF_6$, $LiSbF_6$, $LiCF_3SO_3$, $LiC_4F_9SO_3$, $LiCF_3CO_2$, $Li_2C_2F_4(SO_3)_2$, $LiN(RfSO_2)(Rf'SO_2)$, $LiC(RfSO_2)_3$, $LiC_nF_{2n+1}SO_3$ ($n \geq 2$), and $LiN(RfOSO_2)_2$ [Rf and Rf' are fluoroalkyl groups]. They may be used singly or in combination of two or more species. Among the above-mentioned electrolyte salts, a fluorine-containing organic lithium salt having a carbon number of 2 or greater is particularly preferred. This is because the fluorine-containing organic lithium salt is high in anionic property and readily undergoes ionization, and is thus readily dissolvable in the above-mentioned solvent. No particular limitation is imposed on the concentration of electrolyte salt in a nonaqueous electrolytic solution. However, for example, the concentration is preferably 0.3 mol/L to 1.7 mol/L, more preferably 0.4 mol/L to 1.5 mol/L.

Any anode active material may be used for the negative electrode 14, so long as the material can occlude and release lithium ions. For example, there are used carbonaceous materials, such as graphite, pyrolytic carbon, coke, glassy carbon, a sintered body of organic high polymer compound, meso-carbon microbeads, carbon fiber, and activated carbon. Also, metallic lithium or a lithium-occluding material such as an alloy which contains silicon, tin, indium, or the like; an oxide of silicon, tin, or the like which can perform charge and discharge at low electric potential near that at which lithium does; a nitride of lithium and cobalt such as $Li_{2.6}Co_{0.4}N$ can be used as the anode active material. Further, a portion of graphite can be replaced with a metal which can be alloyed with lithium, or with an oxide. When graphite is used as the anode active material, voltage at full charge can be considered to be about 0.1 V (vs. lithium); thus, the electric potential of the positive electrode 15 can be conveniently calculated as a cell voltage plus 0.1 V. Therefore, since the electric potential of charge of the positive electrode 15 is readily controlled, graphite is preferred.

Figure 1B:
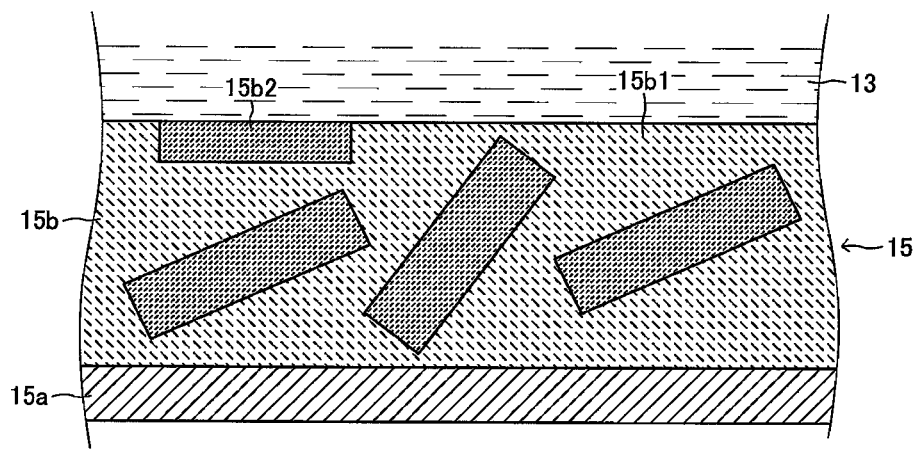
FIG. 1B is an enlarged sectional view of a positive electrode shown in FIG. 1A.

FIG. 1B is an enlarged sectional view of the positive electrode 15 shown in FIG. 1A. Referring to FIG. 1B, the positive electrode 15 includes a cathode collector 15a and a cathode active material layer 15b. The cathode active material layer 15b is composed of a binder 15b1 and plate-like particles 15b2 for cathode active material.

Since the basic configurations of the lithium secondary battery 10 and the positive electrode 15 (including materials used to form the cell casing 11, the separator 12, the electrolyte 13, the negative electrode 14, the cathode collector 15a, and the binder 15b1) shown in FIGS. 1A and 1B are well known, detailed description thereof is omitted herein.

The plate-like particle 15b2 for cathode active material according to an embodiment of the present invention is a particle which contains cobalt and lithium and has a layered rock salt structure; more particularly, a $LiCoO_2$ particle, and is formed into a plate-like form having a thickness of about 2 µm to 100 µm.

<Configuration Example 2 of Lithium Secondary Battery: Full Solid Type>

Figure 2:
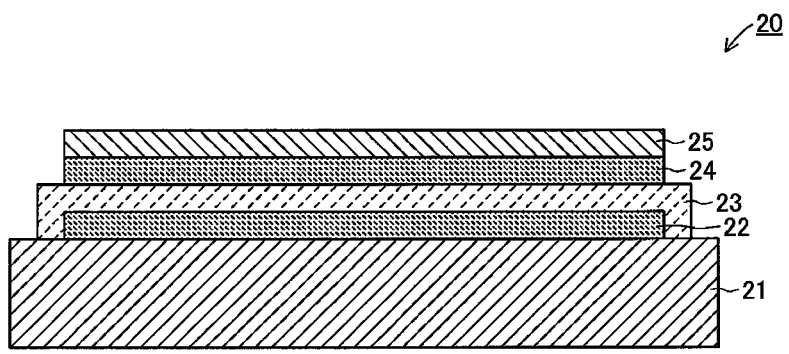
FIG. 2 is a sectional view of the schematic configuration of a lithium secondary battery according to another embodiment of the present invention.

FIG. 2 is a sectional view of the schematic configuration of a lithium secondary battery 20 of another embodiment of the present invention. Referring to FIG. 2, the lithium secondary battery 20 is of a so-called full solid type and includes a cathode collector 21, a cathode active material layer 22, a solid electrolyte layer 23, an anode active material layer 24, and an anode collector 25.

The lithium secondary battery 20 is formed by laminating, on the cathode collector 21, the cathode active material layer 22, the solid electrolyte layer 23, the anode active material layer 24, and the anode collector 25 in this order. The cathode active material layer 22, which serves as the cathode active material film of the present invention, is formed to be film-like.

Since the basic configuration of the lithium secondary battery 20 (including materials used to form the cathode collector 21, the solid electrolyte layer 23, the anode active material layer 24, and the anode collector 25) shown in FIG. 2 is well known, detailed description thereof is omitted herein.

<Configuration Example 3 of Lithium Secondary Battery: Polymer Type>

Figure 3:
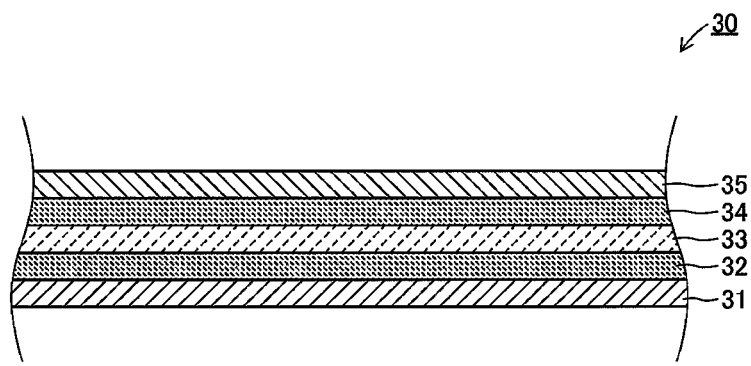
FIG. 3 is a sectional view of the schematic configuration of a lithium secondary battery according to further another embodiment of the present invention.

FIG. 3 is a sectional view of the schematic configuration of a lithium secondary battery 30 of further another embodiment of the present invention. Referring to FIG. 3, the lithium secondary battery 30 is of a so-called polymer type and includes a cathode collector 31, a cathode active material layer 32, a polymer electrolyte layer 33, an anode active material layer 34, and an anode collector 35.

The lithium secondary battery 30 is formed by laminating, on the cathode collector 31, the cathode active material layer 32, the polymer electrolyte layer 33, the anode active material layer 34, and the anode collector 35 in this order. The cathode active material layer 32, which serves as the cathode active material film of the present invention, is formed to be film-like, similarly to the above-described cathode active material layer 22 (see FIG. 2).

<Detailed configuration of Plate-Like Particles for Cathode Active Material and Cathode Active Material Layer>

Figure 4A:
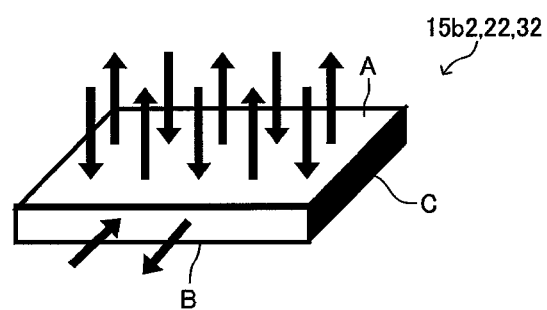
FIG. 4A is an enlarged perspective view of a plate-like particle for cathode active material shown in FIG. 1, a cathode active material layer shown in FIG. 2 or a cathode active material layer shown in FIG. 3.
Figure 4B:
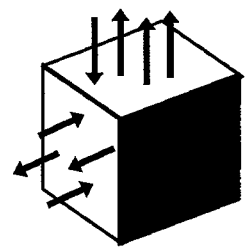
FIG. 4B is an enlarged perspective view of a cathode active material particle of a comparative example.
Figure 4C:
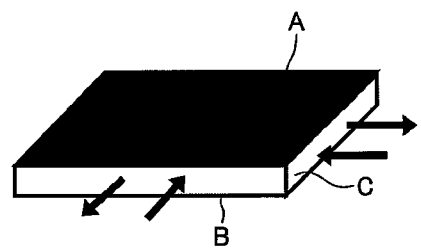
FIG. 4C is an enlarged perspective view of a cathode active material particle of a comparative example.

FIG. 4A is an enlarged perspective view of the plate-like particle 15b2 for cathode active material shown in FIG. 1, the cathode active material layer 22 shown in FIG. 2 or the cathode active material layer 32 shown in FIG. 3. FIG. 4B and FIG. 4C are enlarged perspective views of a cathode active material particle and a cathode active material layer according to comparative examples.

As shown in FIG. 4A, the plate-like particle 15b2 for cathode active material, the cathode active material layer 22 and the cathode active material layer 32 are formed such that the (003) plane is oriented so as to intersect the plate surfaces (upper surface A and lower surface B: hereinafter, the "upper surface A" and the "lower surface B" are referred to as the "plate surface A" and "plate surface B," respectively), which is a surface normal to the thickness direction (the vertical direction in the drawings).

That is, the plate-like particle 15b2 for cathode active material, the cathode active material layer 22 and the cathode active material layer 32 are formed such that the plane other than the (003) plane (e.g., the (104) plane) is oriented in parallel with the plate surfaces A or B of the particle.

In other words, the plate-like particle 15b2 for cathode active material, the cathode active material layer 22 and the cathode active material layer 32 are formed such that the lithium ion gateway plane, which is a plane other than the (003) plane (e.g., the (101) or (104) plane), is exposed at both of the plate surfaces A and B. Specifically, the plate-like particle 15b2 for cathode active material, the cathode active material layer 22 and the cathode active material layer 32 are formed such that the ratio of intensity of diffraction by the (003) plane to intensity of diffraction by the (104) plane, [003]/[104], as obtained by X-ray diffraction, is 0.005 or more and 1.0 or less. The (003) plane (colored black in the drawing) may be exposed at the end surfaces C, which intersects the plate surface direction (in-plane direction).

By contrast, the particle of a comparative (conventional) example shown in FIG. 4B is formed into an isotropic shape rather than a thin plate. The thin plate-like particle or active material film of a comparative (conventional) example shown in FIG. 4C is formed such that the (003) planes are exposed at both surfaces (plate surfaces A and B) located in the thickness direction of the particle.

Figure 5A:
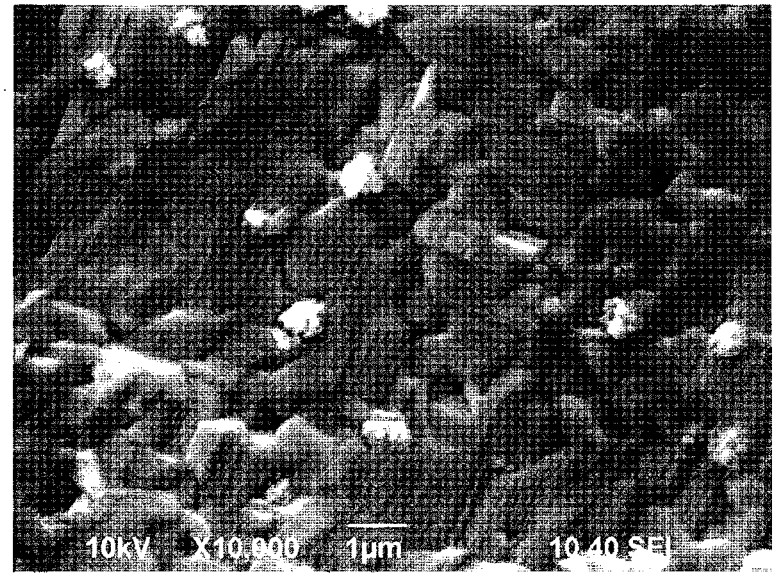
FIG. 5A is a scanning electron micrograph showing the plate surface of the plate-like particle for cathode active material, the cathode active material layer or the cathode active material layer (Example 1) shown in FIG. 4A.
Figure 5B:
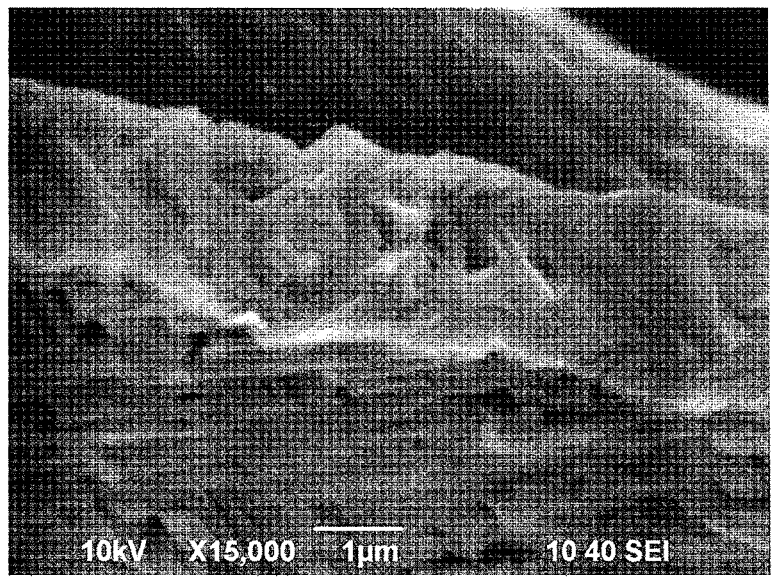
FIG. 5B is a scanning electron micrograph showing the end surface of the plate-like particle for cathode active material, the cathode active material layer or the cathode active material layer (Example 1) shown in FIG. 4A.

FIG. 5A is a SEM photograph showing a plate surface of the plate-like particle 15b2 for cathode active material, the cathode active material layer 22 or the cathode active material layer 32 shown in FIG. 4A. FIG. 5B is a SEM Photograph showing the end surface thereof.

In the plate-like particle 15b2 for cathode active material, the cathode active material layer 22 and the cathode active material layer 32 according to the present embodiment, as shown in FIG. 5A, a large number of microscopic step-like structures are two-dimensionally (in multiple directions in a plane view) formed along the plate surface. This step-like structure is generally formed in a size of 1 to several µm in a plane view and with a step height of 0.1 to 2

Figure 6A:
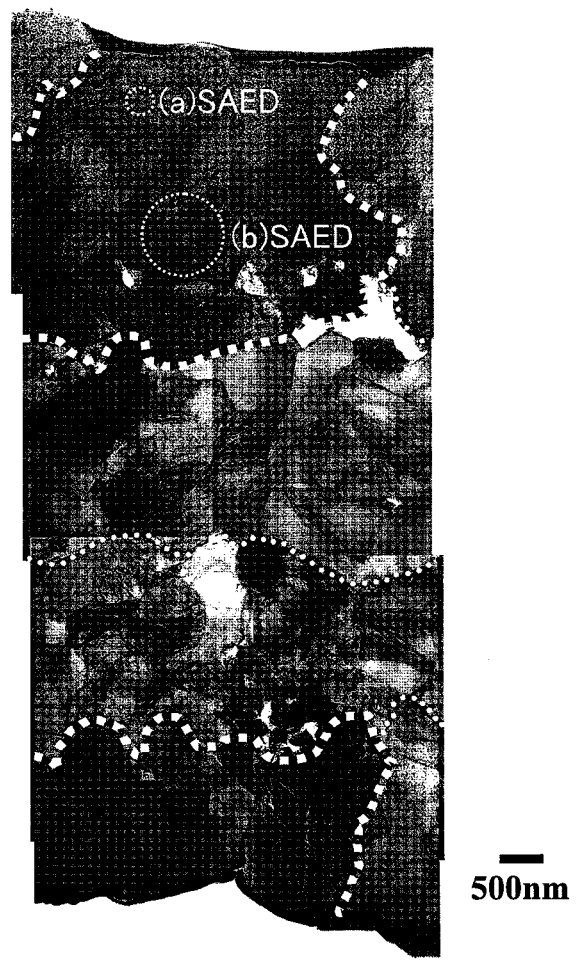
FIG. 6A is a transmission electron micrograph showing the cross section of the plate-like particle for cathode active material, the cathode active material layer or the cathode active material layer (Example 1) shown in FIG. 4A.
Figure 6B:
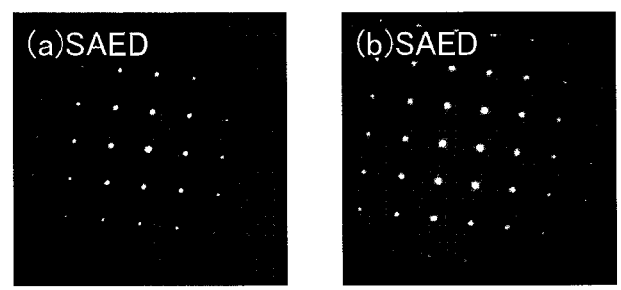
FIG. 6B is a photograph showing selected-area electron diffraction image of the regions (a) and (b) shown in FIG. 6A.

FIG. 6A is a transmission electron micrograph showing the cross section of the plate-like particle 15b2 for cathode active material, the cathode active material layer 22 or the cathode active material layer 32 (corresponding to Example 1 to be described later) shown in FIG. 4A (the condition for observation will be described later). FIG. 6B is a photograph showing selected-area electron diffraction image of the regions (a) and (b) shown in FIG. 6A.

As shown in FIG. 6A, the plate-like particle 15b2 for cathode active material, the cathode active material layer 22 and the cathode active material layer 32 according to the present embodiment have a structure wherein a plurality of layered regions are stacked together in the thickness direction. That is, a layered region in relatively dark grey color appears in the upper portion (about ⅓ from the top) in FIG. 6A.

From FIG. 6B showing the selected-area electron diffraction images at the two points within the layered region (see the regions (a) and (b) in the drawing), it can be confirmed that all the crystal axes at these points are identical. That is, the layered regions including the regions (a) and (b) in FIG. 6A and having the same bright-field image as them can be considered to be formed as to be a configuration wherein crystallites having an identical crystal axis are densely joined.

Similarly, a layered region in relatively dark grey color appears in the lower portion (about ⅕ from the bottom) in FIG. 6A, as well. The layered regions are also formed as to be a configuration wherein crystallites having an identical crystal axis are densely joined.

The layered regions in relatively light grey color are formed as to be further divided into two layers in the thickness direction (in the vertical direction in the drawing) (it has been confirmed by means of a transmission electron micrograph and a selected-area electron diffraction image of another cross section). In addition, by means of a electron diffraction image, it has been confirmed that every layer is oriented in parallel with the plate surface of the particle.

Thus, the plate-like particle 15b2 for cathode active material, the cathode active material layer 22 and the cathode active material layer 32 according to the present embodiment have a structure wherein a plurality (four in the example in FIG. 6A) of layered regions (each of the layered regions is formed as to be a configuration wherein crystallites having an identical crystal axis are densely joined) are stacked together in the thickness direction.

Figure 7:
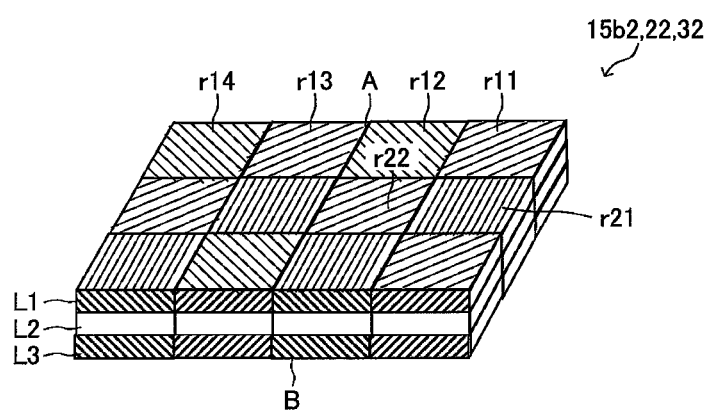
FIG. 7 is an enlarged perspective view of the plate-like particle for cathode active material, the cathode active material layer or the cathode active material layer shown in FIG. 4A.

A schematic configuration of the plate-like particle 15b2 for cathode active material, the cathode active material layer 22 and the cathode active material layer 32 according to the present embodiment having the above-described structure is shown in FIG. 7.

That is, as shown in FIG. 7, the plate-like particle 15b2 for cathode active material, the cathode active material layer 22 and the cathode active material layer 32 according to the present embodiment are formed such that the particular lithium ion gateway plane (e.g., the (104) plane) other than the (003) plane is oriented in parallel with the plate surfaces A and B of the particle and such that the other planes face random directions. In other words, the plate-like particle 15b2 for cathode active material, the cathode active material layer 22 and the cathode active material layer 32 have a structure divided into a plurality of regions r11, r12, r13, r14, . . . , r21, r22, . . . in which, while the above-mentioned particular lithium ion gateway plane is exposed at the plate surfaces A and B, the other planes face different directions. Each of the regions r11, r12, r13, r14, . . . , r21, r22 corresponds to one step in the above-mentioned step-like structure.

Thus, by means of the above-mentioned orientation and two-dimensional (random) step-like structure, in the regions r11, r12, r13, r14, . . . , r21, r22, . . . , while the [hkl] axes corresponding to the normals to the above-mentioned particular (hkl) plane are oriented in the same direction (the thickness direction; i.e., the vertical direction in the drawing), the [h'k'l'] axes corresponding to the normals to the other (h'k'l') planes are oriented in random directions. That is, the adjacent regions (e.g., r11 an r12) differ in the direction of the [h'k'l'] axis.

Such a so-called "uniaxially oriented" state can be confirmed by means of one of the following two methods.

One or two of opposite plate surfaces of the plate-like particle were sliced off by means of FIB (focused ion beam) to obtain a piece(s) having a thickness of about 80 nm. The plate surface of the piece(s) was observed through a transmission electron microscope. In the selected-area electron diffraction image, 10 or more portions having the [104] axis oriented perpendicular to the plate surface were observed, and it was confirmed that, at these portions, orientation within the plate surface was randomized.

The plate-like particles were placed on a slide glass substrate in such a manner as to not overlap one another and such that the particle plate surfaces were in surface contact with the plate surface of the glass substrate. Specifically, a mixture prepared by adding plate-like particles (0.1 g) to ethanol (2 g) was subjected to dispersion for 30 minutes by means of an ultrasonic dispersing device (ultrasonic cleaner); and the resultant dispersion liquid was spin-coated at 2,000 rpm onto the glass substrate measuring 25 mm×50 mm so as to place the plate-like particles on the glass substrate. Then, the particles placed on the glass substrate were transferred to an adhesive tape. The resultant tape was embedded in resin, followed by polishing for enabling observation of the polished cross-sectional surface of a plate-like particle. Finish polishing was carried out by means of a vibrating rotary polisher using colloidal silica (0.05 µm) as abrasive. The thus-prepared sample was subjected to crystal orientation analysis of the cross section of a single particle by an electron backscattered diffraction image process (EBSD). It was confirmed from the analysis that the particle plate surface was divided into a plurality of regions in which the [104] axes are perpendicular to the plate surface (i.e., the (104) planes are oriented along the plate surface), whereas crystal axes other than the [104] axes (crystal axes intersecting with the [104] axes) are oriented in random directions.

In addition, the above-mentioned regions r11, r12, r13, r14, r21, r22, . . . arraying in a plate surface direction are densely joined one another in the plate surface direction to form a layer L1. Further, the layer L1 and similarly configured layers L2, L3 . . . are stacked together in the thickness direction (the layers differ in the above-mentioned [hkl] axis. Although the plate-like particle 15b2 for cathode active material and the like are illustrated so as to consist of three layers in FIG. 7 for the sake of convenience in drawing, it may have two layers, or four or more layers).

Preferably, the thickness of the individual regions (e.g., regions r11) is such that a length along a thickness direction is 0.2 µm to 5 µm. When the length is in excess of 5 µm, cracking is apt to occur in the region. When the length is less than 0.2 µm, boundary portions of the regions, at which boundary portions lithium ions encounter difficulty in moving, increase, resulting in deterioration in charge-discharge characteristics.

<Outline of Method for Manufacturing Plate-Like Particles for Cathode Active Material and Cathode Active Material Layer>

The outline of method for manufacturing the plate-like particles 15b2 for cathode active material, the cathode active material layer 22 and the cathode active material layer 32 having the above-mentioned structure will be described below.

1. Preparation of Material Particles

For synthesizing a cathode active material $LiMO_2$ having a layered rock salt structure, particles of compounds of Li, Co, Ni, Mn, etc. are appropriately used as particle-form starting materials. Alternatively, a particle-form starting material having a composition of $LiMO_2$ (synthesized particles) may also be used.

Alternatively, there may be used particles prepared by mixing particles of compounds of Co, Ni, Mn, etc., excluding lithium compound, or particles having a composition of (Co, Ni,Mn)$O_x$. In this case, after a step of sintering a compact, the sintered compact and a lithium compound are reacted with each other, thereby yielding $LiMO_2$ (details will be described hereinbelow).

For the purpose of accelerating grain growth or compensating volatilization during sintering, a lithium compound may be added in an excess amount of 0.5 mol % to 30 mol %. Alternatively, for the purpose of accelerating grain growth, a low-melting-point oxide, such as bismuth oxide, or low-melting-point glass, such as borosilicate glass, may be added in an amount of 0.001 wt % to 30 wt %.

2. Forming Step for Material Particles

Material particles are formed into a sheet-like self-standing compact having a thickness of 100 μm or less. "Self-standing" in "self-standing compact" is synonymous with "independent" in "independent sheet" to be mentioned later. Specifically, the "self-standing compact" is typically a compact which can maintain the form of a sheet-like compact by itself. The "self-standing compact" also encompasses a compact which is formed by affixing or film-forming material particles on a substrate and then separating the resultant compact from the substrate before or after sintering, even though the compact fails to maintain the form of a sheet-like compact by itself.

An employable method for forming a compact is, for example, a doctor blade process using a slurry which contains material particles. Alternatively, a drum drier can be used for formation of a compact; specifically, slurry which contains material is applied onto a heated drum, and then the dried material is scraped off with a scraper. A disk drier can also be used; specifically, slurry is applied onto a heated disk surface, and then the dried material is scraped off with a scraper. Also, hollow granular bodies obtained by appropriately setting conditions of a spray drier can be considered a sheet-like compact having curvature and thus can be preferably used as a compact. Further, an extruding process using a body which contains material particles can be used as a forming method for a compact.

When the doctor blade process is employed, the procedure may be as follows: slurry is applied onto a flexible plate (e.g., an organic polymer plate, such as a PET film); the applied slurry is dried and solidified into a compact; and the compact is separated from the plate, thereby yielding a green compact of plate-like polycrystalline particles. Slurry and body before forming may be prepared as follows: inorganic particles are dispersed in an appropriate dispersion medium, and then binder and plasticizer are added as appropriate. Preferably, slurry is prepared so as to have a viscosity of 500 cP to 4,000 cP and is defoamed under reduced pressure.

The thickness of a compact is preferably 50 μm or less, more preferably 20 μm or less. Preferably, the thickness of the compact is 2 μm or greater. When the thickness is 2 μm or greater, a self-standing sheet-like compact can be readily formed. Since the thickness of the sheet-like compact is substantially equal to the thickness of a plate-like particle, the thickness of the sheet-like compact is set as appropriate according to applications of the plate-like particles.

3. Step of Sintering a Compact

In the sintering step, a compact yielded in the forming step is placed on a setter, for example, as is (in a sheet state), followed by sintering. Alternatively, the sintering step may be performed as follows: the sheet-like compact is cut up or fragmentized as appropriate, and the resultant pieces are placed in a sheath, followed by sintering.

When material particles are unsynthesized mixed particles, in the sintering step, synthesis, sintering, and grain growth occur. In the present invention, since the compact assumes the form of a sheet having a thickness of 100 μm or less, grain growth in the thickness direction is limited. Thus, after grain growth progresses in the thickness direction of the compact until a single crystal grain is completed, grain growth progresses only in in-plane directions of the compact. At this time, particular crystal face which is energetically stable spreads in the sheet surface (plate surface). Thus, there is yielded a film-like sheet (self-standing film) in which particular crystal face is oriented in parallel with the sheet surface (plate surface).

When material particles are of $LiMO_2$, the (101) and (104) planes, which are crystal faces through which lithium ions are favorably intercalated and deintercalated, can be oriented so as to be exposed at the sheet surface (plate surface). When material particles do not contain lithium (e.g., material particles are of $M_3O_4$ having a spinel structure), the (h00) planes, which will become the (104) planes when reacting with a lithium compound to thereby yield $LiMO_2$, can be oriented so as to be exposed at the sheet surface (plate surface).

Preferably, the sintering temperature is 800° C. to 1,350° C. When the temperature is lower than 800° C., grain growth becomes insufficient; thus, the degree of orientation becomes low. When the temperature is in excess of 1,350° C., decomposition and volatilization progress. Preferably, the sintering time falls within a range of 1 hour to 50 hours. When the time is shorter than one hour, the degree of orientation becomes low. When the time is longer than 50 hours, energy consumption becomes excessively large. The atmosphere of sintering is set as appropriate such that decomposition during sintering does not progress. In the case where volatilization of lithium progresses, preferably, a lithium atmosphere is established through disposition of lithium carbonate or the like within the same sheath. In the case where release of oxygen and reduction progress during sintering, preferably, sintering is carried out in an atmosphere having high partial pressure of oxygen.

4. Crushing Step and Lithium Introduction Step

Plate-like particles are yielded as follows: the sintered sheet-like compact is placed on a mesh having a predetermined mesh size, and then a spatula is pressed against the sheet from above, whereby the sheet is crushed into a large number of plate-like particles. The crushing step may be performed after the lithium introduction step.

In the case where a sheet is formed from starting material particles which do not contain a lithium compound, and is then sintered for orientation, or plate-like particles are yielded through crushing of the sheet, the sheet or the plate-like particles are reacted with a lithium compound (lithium nitrate, lithium carbonate, etc.), thereby yielding a cathode active material film in which a crystal face of good intercalation and deintercalation is oriented so as to be exposed at the plate surface. For example, lithium is introduced by sprinkling lithium nitrate over the oriented sheet or particles such that the mole ratio between Li and M, Li/M, is 1 or higher, followed by heat treatment. Preferably, the heat treatment temperature is 600° C. to 800° C. When the temperature is lower than 600° C., the reaction does not progress sufficiently. When the temperature is higher than 800° C., orientation deteriorates.

Next, a typical method for manufacturing $LiCoO_2$ particles or film will be described.

<Specific Example of Method for Manufacturing Plate-Like Particles for Cathode Active Material and Cathode Active Material Layer>

The plate-like particles 15b2 for cathode active material, the cathode active material layer 22 and the cathode active material layer 32 having the above-mentioned structure are readily and reliably manufactured by the following manufacturing method.

<<Sheet Formation Step>>

A green sheet which contains $Co_3O_4$ and $Bi_2O_3$ and has a thickness of 20 μm or less is formed. The green sheet is sintered at a temperature falling within a range of 900° C. to 1,300° C. for a predetermined time, thereby yielding an independent film-like sheet ("independent sheet" is synonymous with the aforementioned "self-standing film") in which the (h00) planes are oriented in parallel with the plate surface (the orientation may be referred to merely as "(h00) orientation") and which is composed of a large number of plate-like $Co_3O_4$ particles. In the course of the sintering, bismuth is removed from the sheet through volatilization, and $Co_3O_4$ is phase-transformed to CoO through reduction.

The "independent" sheet refers to a sheet which, after sintering, can be handled by itself independent of the other support member. That is, the "independent" sheet does not include a sheet which is fixedly attached to another support member (substrate or the like) through sintering and is thus integral with the support member (unseparable or difficult to be separated).

In the thus-formed green sheet in the form of a film, the amount of material present in the thickness direction is very small as compared with that in a particle plate surface direction; i.e., in an in-plane direction (a direction orthogonal to the thickness direction).

Thus, at the initial stage at which a plurality of particles are present in the thickness direction, grain growth progresses in random directions. As the material in the thickness direction is consumed with progress of grain growth, the direction of grain growth is limited to two-dimensional directions within the plane. Accordingly, grain growth in planar directions is reliably accelerated.

Particularly, by means of forming the green sheet to the smallest possible thickness (e.g., several µM or less) or accelerating grain growth to the greatest possible extent despite a relatively large thickness of about 100 µm (e.g., about grain growth in planar directions is more reliably accelerated.

At this time, only those particles whose crystal faces having the lowest surface energy are present within the plane of the green sheet selectively undergo in-plane flat (plate-like) grain growth. As a result, sintering the sheet yields plate-like crystal grains of CoO which have high aspect ratio and in which particular crystal faces (herein, the (h00) planes) are oriented in parallel with the plate surfaces of the grains.

In the process of temperature lowering, CoO is oxidized into $Co_3O_4$. At this time, the orientation of CoO is transferred, thereby yielding plate-like crystal grains of $Co_3O_4$ in which particular crystal faces (herein, the (h00) planes) are oriented in parallel with the plate surfaces of the grains.

In the oxidation from CoO to $Co_3O_4$, the degree of orientation is apt to deteriorate for the following reason: since CoO and $Co_3O_4$ differ greatly in crystal structure and Co—O interatomic distance, oxidation; i.e., insertion of oxygen atoms, is apt to be accompanied by a disturbance of crystal structure. Thus, preferably, conditions are selected as appropriate so as to avoid deterioration in the degree of orientation to the greatest possible extent. For example, reducing the temperature-lowering rate, holding at a predetermined temperature, and reducing the partial pressure of oxygen are preferred.

Thus, sintering such a green sheet yields a self-standing film formed as follows: a large number of thin plate-like grains in which particular crystal faces are oriented in parallel with the plate surfaces of the grains are joined together at grain boundaries in planar directions (refer to Japanese Patent Application No. 2007-283184 filed by the applicant of the present invention). That is, there is formed a self-standing film in which the number of crystal grains in the thickness direction is substantially one. The meaning of "the number of crystal grains in the thickness direction is substantially one" does not exclude a state in which portions (e.g., end portions) of in-plane adjacent crystal grains overlie each other in the thickness direction. The self-standing film can become a dense ceramic sheet in which a large number of thin plate-like grains as mentioned above are joined together without clearance therebetween.

<<Crushing Step>>

The film-like sheet (self-standing sheet) yielded in the above-mentioned sheet formation step is in such a state that the sheet is apt to break at grain boundaries. Thus, the film-like sheet yielded in the above-mentioned sheet formation step is placed on a mesh having a predetermined mesh size, and then a spatula is pressed against the sheet from above, whereby the sheet is crushed into a large number of $Co_3O_4$ particles.

<<Lithium Introduction Step>>

The (h00)-oriented (the meaning of "(h00) orientation" is mentioned above) $Co_3O_4$ particles yielded in the above-mentioned crushing step and $Li_2CO_3$ are mixed. The resultant mixture is heated for a predetermined time, whereby lithium is introduced into the $Co_3O_4$ particles. Thus, there is yielded (104)-oriented $LiCoO_2$; i.e., the plate-like particles 15b2 for cathode active material.

The crushing step may be carried out after the lithium introduction step.

In addition to lithium carbonate, there can be used as a lithium source for lithium introduction, for example, various lithium salts, such as lithium nitrate, lithium acetate, lithium chloride, lithium oxalate, and lithium citrate; and lithium alkoxides, such as lithium methoxide and lithium ethoxide.

For enhancement of orientation of $LiCoO_2$ particles, conditions in lithium introduction; specifically, Li/Co molar ratio, heating temperature, heating time, atmosphere, etc., must be set as appropriate in consideration of melting point, decomposition temperature, reactivity, etc. of a material to be used as a lithium source.

For example, when the mixture of (h00)-oriented $Co_3O_4$ particles and a lithium source react with each other in a very active state, the orientation of $Co_3O_4$ particles may be disturbed, which is undesirable. The active state means, for example, the following state: the lithium source becomes excessive in amount and becomes a liquid state, and not only are intercalated lithium ions into crystals of $Co_3O_4$ particles, but also $Co_3O_4$ particles are dissolved and re-precipitated in the liquid of the lithium source.

In addition, by carrying out the lithium introduction step on the film-like sheet (self-standing film) obtained by the above-mentioned sheet formation step without the crushing step, the cathode active material layer 22 and the cathode active material layer 32, which are (104)-oriented $LiCoO_2$ membrane, can be obtained.

EXAMPLES

Next will be described in detail specific examples of the above-mentioned manufacturing methods, and the film or particles manufactured by the methods, along with the results of evaluation thereof.

First, particles of a comparative example were prepared by the following method.

At first, a slurry was prepared by the following method: A $LiCoO_2$ powder (product of Nippon Chemical Industrial Co., Ltd., Cellseed C-5, average particle size: 10 µm) was pulverized in a pot mill to a average particle size of 0.5 µm. The resultant pulverized powder (100 parts by weight), a dispersion medium (toluene:isopropanol=1:1) (100 parts by weight), a binder (polyvinyl butyral: product No. BM-2; product of Sekisui Chemical Co. Ltd.) (10 parts by weight), a plasticizer (DOP: Di(2-ethylhexyl) phthalate; product of Kurogane Kasei Co., Ltd.) (4 parts by weight), and a dispersant (product name RHEODOL SP-030, product of Kao Corp.) (2 parts by weight) were mixed. The resultant mixture was stirred under reduced pressure for defoaming and was prepared to a viscosity of 3,000 cP to 4,000 cP. The viscosity was measured by means of an LVT-type viscometer, a product of Brookfield Co., Ltd.

The thus-prepared slurry was formed into a sheet on a PET film by the doctor blade process such that the thickness of the sheet was 16 μm as measured after drying.

A 30 mm square piece was cut out from the sheet-like compact separated from the PET film by means of a cutter; the piece was placed at the center of a setter (dimensions: 90 mm square×1 mm high) made of zirconia and embossed in such a manner as to have a protrusion size of 300 μm; sintering was performed at 900° C. for 10 hours; and thereafter a portion of the piece which was not fused to the setter was taken out.

The $LiCoO_2$ ceramic sheet which was yielded through sintering was placed on a polyester mesh having an average opening diameter of 100 μm, and then a spatula was lightly pressed against the ceramic sheet so as to cause the ceramic sheet to pass through the mesh, thereby crushing the ceramic sheet into powdery $LiCoO_2$ (a comparative example, particle thickness: 10 μm).

Example 1

<<Manufacturing Method>>

First, a slurry was prepared by the following method: A $Co_3O_4$ powder (particle size: 1 μm to 5 μm; product of Seido Chemical Industry Co., Ltd.) was pulverized, yielding $Co_3O_4$ particles (particle size: 0.3 μm); $Bi_2O_3$ (particle size: 0.3 μm; product of Taiyo Koko Co., Ltd.) was added in an amount of 20 wt. % to the $Co_3O_4$ particles; and the resultant mixture (100 parts by weight), a dispersion medium similar to the above-mentioned (100 parts by weight), a binder (10 parts by weight), a plasticizer (4 parts by weight), and a dispersant (2 parts by weight) were mixed. The resultant mixture was stirred under reduced pressure for defoaming and was prepared to a viscosity of 4,000 cP.

The thus-prepared slurry was formed into a sheet on a PET film by the doctor blade process such that the thickness of the sheet was 10 μm as measured after drying.

A 70 mm square piece was cut out from the sheet-like compact separated from the PET film by means of a cutter; the piece was placed at the center of a setter (dimensions: 90 mm square×1 mm high) made of zirconia and embossed in such a manner as to have a protrusion size of 300 μm; sintering was performed at 1,200° C. for 5 hours; temperature was lowered at a rate of 50° C./h; and a portion of the piece which was not fused to the setter was taken out.

A $Li_2CO_3$ powder (product of Kanto Chemical Co., Inc.) was sprinkled over the thus-yielded $Co_3O_4$ ceramic sheet such that the ratio Li/Co became 1.0. The thus-prepared ceramic sheet was thermally treated within a crucible at 750° C. for 3 hours, thereby yielding an $LiCoO_2$ ceramic sheet (self-standing film: corresponding to the cathode active material layer 22 or 32) having a thickness of 10 μm.

The $LiCoO_2$ ceramic sheet was placed on a polyester mesh having an average opening diameter of 100 μm, and then a spatula was lightly pressed against the ceramic sheet so as to cause the ceramic sheet to pass through the mesh, thereby crushing the ceramic sheet into powdery $LiCoO_2$ (corresponding to the plate-like particles 15b2 for cathode active material).

Example 2

<<Manufacturing Method>>

A slurry having a viscosity of 500 to 700 cP was prepared from a material and through a method similar to the above-mentioned Example 1. The thus-prepared slurry was formed into a sheet on a PET film by the doctor blade process such that the thickness of the sheet was 2 μm as measured after drying.

A 70 mm square piece was cut out from the sheet-like compact separated from the PET film by means of a cutter; the piece was placed at the center of a setter (dimensions: 90 mm square×1 mm high) made of zirconia and embossed in such a manner as to have a protrusion size of 300 μm; sintering was performed at 1,150° C. for 5 hours; temperature was lowered at a rate of 50° C./h; and a portion of the piece which was not fused to the setter was taken out.

The ceramic sheet which was yielded through sintering was placed on a mesh having an opening diameter of 100 μm, and then a spatula was lightly pressed against the ceramic sheet so as to cause the ceramic sheet to pass through the mesh, thereby crushing the ceramic sheet. A $Co_3O_4$ powder yielded through crushing of the ceramic sheet and an $Li_2CO_3$ powder (product of Kanto Chemical Co., Inc.) were mixed at a ratio Li/Co of 1.0. The resultant mixture was thermally treated within a crucible at 750° C. for 3 hours, thereby yielding powdery $LiCoO_2$.

Namely, in Example 2, unlike Example 1 where lithium was introduced into $Co_3O_4$ sheet, before the introduction of lithium, $Co_3O_4$ sheet was crushed to powder, and thereafter lithium was introduced into the powdery $Co_3O_4$.

Example 3

The particles in the above-mentioned Example 1 were heat-treated in air (900° C., 24 hours).

<<Results of Evaluation>>

FIG. 6A is a photograph showing the result of observation of the $LiCoO_2$ particle of Example 1 by means of an electron microscope. The observation by means of a transmission electron microscope was carried out by the following method: the plate-like particle of Experimental Example 1 were sliced off in a plate surface direction by means of FIB (focused ion beam) to obtain a piece(s) having a thickness of about 80 nm, and the internal structure thereof was observed. FIG. 5A and FIG. 5B are photographs showing the result of observation of the $LiCoO_2$ particle of Example 2 by means of an electron microscope.

In addition, for the particles of the comparative example and individual examples, the orientations thereof were evaluated by means of an X-ray diffraction (XRD). XRD measurement was carried out by the following method.

A mixture prepared by adding the $LiCoO_2$ particles (0.1 g) to ethanol (2 g) was subjected to dispersion for 30 minutes by means of an ultrasonic dispersing device (ultrasonic cleaner); and the resultant dispersion liquid was spin-coated at 2,000 rpm onto a glass substrate measuring 25 mm×50 mm so as to prevent overlap of the particles to the greatest possible extent and to bring crystal faces in parallel with the glass substrate surface. By means of an XRD apparatus (GEIGER FLEX RAD-IB, product of Rigaku Corp.), the surfaces of the particles were irradiated with X-ray so as to measure an XRD profile, thereby obtaining the ratio of intensity (peak height) of diffraction by the (003) plane to intensity (peak height) of diffraction by the (104) plane, [003]/[104]. In the above-mentioned method, the plate surface of the plate-like particles are in surface contact with the glass substrate surface, so that the particle plate surface is in parallel with the glass substrate surface. Thus, according to the above-mentioned method, there is obtained a profile of diffraction by crystal faces present in parallel with crystal faces of the particle plate surface; i.e., a profile of diffraction by crystal faces oriented in a plate surface direction of a particle.

Further, cell characteristics (capacity retention percentage) was evaluated in the following manner.

The $LiCoO_2$ particles, acetylene black, and polyvinylidene fluoride (PVDF) were mixed at a mass ratio of 75:20:5, thereby preparing a positive-electrode material. The prepared positive-electrode material (0.02 g) was compacted to a disk having a diameter of 20 mm under a pressure of 300 kg/cm$^2$, thereby yielding a positive electrode.

The yielded positive electrode, a negative electrode formed from a lithium metal plate, stainless steel collector plates, and a separator were arranged in the order of collector plate—positive electrode—separator—negative electrode—collector plate. The resultant laminate was filled with an electrolytic solution, thereby yielding a coin cell. The electrolytic solution was prepared as follows: ethylene carbonate (EC) and diethyl carbonate (DEC) were mixed at a volume ratio of 1:1 so as to prepare an organic solvent, and $LiPF_6$ was dissolved in the organic solvent at a concentration of 1 mol/L.

The thus-fabricated coin cell was evaluated for cell capacity (discharge capacity) and capacity retention percentage.

One cycle consists of the following charge and discharge operations: constant-current charge is carried out at 0.1 C rate of current until the cell voltage becomes 4.2 V; subsequently, constant-voltage charge is carried out under a current condition of maintaining the cell voltage at 4.2 V, until the current drops to 1/20, followed by 10 minutes rest; and then, constant-current discharge is carried out at 1 C rate of current until the cell voltage becomes 3.0 V, followed by 10 minutes rest. A total of three cycles were repeated under a condition of 25° C. The discharge capacity in the third cycle was measured.

The fabricated cell was subjected to cyclic charge-discharge at a test temperature of 25° C. The cyclic charge-discharge repeats: (1) charge at 1 C rate of constant current and constant voltage until 4.2 V is reached, and (2) discharge at 1 C rate of constant current until 3.0 V is reached. The capacity retention percentage (%) was defined as a value obtained by dividing the discharge capacity of the cell as measured after 100 charge-discharge cycles by the initial discharge capacity of the cell.

The following Table 1 collectively shows the results of evaluation of each examples and comparative example.

TABLE 1

| | Thickness [μm] | [003]/ [104] | Number of Layers | Crystallite Aggregation | Capacity retention percentage [%] |
|---|---|---|---|---|---|
| Example 1 | 10 | 0.4 | 4 | Observed | 94 |
| Example 2 | 2 | 0.4 | 2 | Observed | 96 |
| Example 3 | 10 | 0.4 | 4 | None | 90 |
| Comparative Example | 10 | 3.0 | 1 | None | 80 |

The $LiCoO_2$ particles of the examples were highly (104)-oriented, and the exposure of the (104) plane, though which lithium ions are readily released, at the plate surfaces increased (see the result of XRD measurements in Table 1). As mentioned above, such a structure can be readily and reliably obtained by carrying out the lithium introduction step on the $Co_3O_4$ film or particle which is (h00)-oriented, not (111)-oriented. By contrast, the (conventional) $LiCoO_2$ particles of the comparative example were highly (003)-oriented, and the exposure of the (003) plane at the plate surfaces increased (see the result of XRD measurements in Table 1).

Figure 8:
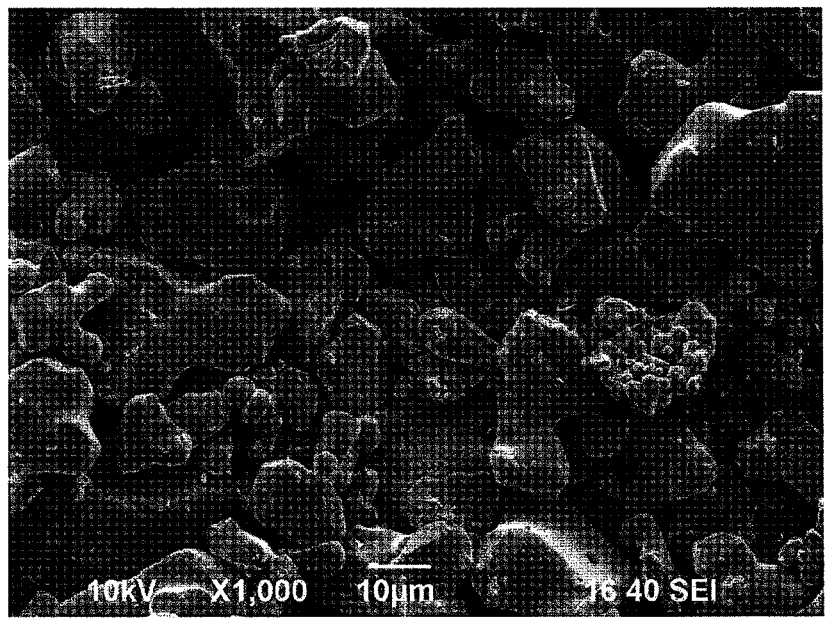
FIG. 8 is a scanning electron micrograph showing the surface of a cathode active material particle according to a comparative example.

In addition, for the $LiCoO_2$ particle of the examples, on the plate surfaces (plate surfaces A and B in FIG. 4A), a large number of microscopic step-like structures with a size of 1 to several μm as viewed in plane and a step height of 0.1 to 2 μm are formed in multiple directions as viewed in plane (specifically, in two directions, i.e. a direction slanting at angles of about 10 degrees with the vertical direction in FIG. 5A and a direction orthogonal thereto). By contrast, in the conventional (commercially available) $LiCoO_2$ particles, such a step-like structure does not appear (see FIG. 8).

The above structural difference appears also in the result of observation by means of a scanning electron microscope. That is, in the $LiCoO_2$ particle of Example 1, it can be observed that fine streaks appear on the surface (within the above-mentioned microscopic step-like structures). By contrast, in the conventional (Comparative Example) $LiCoO_2$ particles, it can be observed that a smooth (003) plane is exposed.

Further, it was confirmed that, as mentioned above, the $LiCoO_2$ particle of Example 1 were formed as a configuration in which a plurality of (four) layered regions (domains) are stacked together in the thickness direction and crystallites having the same crystal axis are densely joined together (see FIG. 6A and FIG. 6B).

Similarly, it was confirmed that the $LiCoO_2$ particle of Example 2 had a structure in which two domains formed by aggregation of crystallites were stacked together in a thickness direction. In the $LiCoO_2$ particles of Example 3, although a stacked structure consisting of four layers of domain, any grain boundaries were not confirmed. By contrast, as a result of the evaluation of Comparative Example, it had a monolayer structure and any grain boundaries were not confirmed.

The particles of these examples have a very dense structure. Porosity as measured from the results of image processing of images obtained through a scanning electron microscope was 10% or less. In addition, in the $LiCoO_2$ particles of the examples, good cell capacity characteristics (capacity retention percentage) were exhibited. This is believed to due to the following reasons.

Namely, in accordance with the characteristics (orientation) of the particle plate surface, the lithium ion gateway plane (the (104) plane and the like) exposes more to an electrolyte, and thus the capacity is improved. Particularly, by means of the above-mentioned step-like structures, the effect of the improvement of capacity becomes larger.

To the film or particles of the active material, acetylene black added as electron conductive auxiliary has been adhered. In many cases, acetylene black exhibits a structure wherein the primary particles, which are spherical nanosized particles with a diameter of dozens to about 100 nm, are botryoidally aggregated. When the surface of the film or particles of the active material was covered with the acetylene black aggregates, the substantial contact area with an electrolyte decreases.

In this connection, in the present embodiment, step-like structures are formed on the surface of the film or particles of the active material, and thus the acetylene black aggregates adhere the ridge line of the steps so as to contact with the same, and the valley portions of the steps contact with the electrolyte (pools of liquid are formed). Therefore, the substantial contact area of the surface of the film or particles of the active material with an electrolyte can be maintained to be large.

In addition, a large number of the step-like structures are randomly and two-dimensionally formed, and thus the substantial contact area of the surface of the film or particles of the active material with an electrolyte can be retained larger (by contrast, when the step-like structures are one dimensional as shown in FIG. 6 in Japanese Patent Application Laid-Open (kokai) No. 2003-132887, the acetylene black aggregates are arranged densely along the longitudinal direction of the step, and thus the substantial contact area with an electrolyte decreases).

Further, the domain-stacked structure as mentioned above relieves the internal stress occurred on the volume expansion-contraction associated with charge-discharge cycles at a boundary between the domains. Thereby, durability and cycle characteristic are improved.

In ordinary $LiCoO_2$ particles (as shown in FIGS. 4B and 4C), reducing the particle size enhances rate characteristic because of an increase in specific surface, but is accompanied by a deterioration in durability due to a deterioration in particle strength, and a reduction in capacity due to an increase in the percentage of a binder. In this manner, in ordinary (conventional) $LiCoO_2$ particles, the rate characteristic is in trade-off relation with durability and capacity.

By contrast, in the plate-like particles for cathode active material of the present embodiment, when durability and capacity are enhanced through an increase in particle size, the total area of those planes through which lithium ions are readily released also increases, so that high rate characteristic is obtained. Thus, according to the present embodiment, capacity, durability, and rate characteristic can be enhanced as compared with conventional counterparts.

Particularly, a lithium ion secondary cell for use in mobile equipment, such as cellphones and notebook-style PCs, is required to provide high capacity for long hours of use. For implementation of high capacity, increasing the filling rate of an active material powder is effective, and the use of large particles having a particle size of 10 μm or greater is preferred in view of good filling performance.

In this regard, according to conventional techniques, an attempt to increase the particle size to 10 μm or greater leads to a plate-like particle in which the (003) planes, through which lithium ions and electrons cannot be intercalated and deintercalated, are exposed at a wide portion of the plate surface of the plate-like particle (see FIG. 2C) for the reason of crystal structure, potentially having an adverse effect on charge-discharge characteristics.

By contrast, in the plate-like particle for cathode active material of the present embodiment, conductive planes for lithium ions and electrons are widely exposed at the surface of the plate-like particle. Thus, according to the present embodiment, the particle size of the $LiCoO_2$ plate-like particles can be increased without involvement of adverse effect on charge-discharge characteristics. Therefore, the present embodiment can provide a positive-electrode material sheet having high capacity and a filling rate higher than that of a conventional counterpart.

The plate-like particle 15b2 for cathode active material, a cathode active material layer 22, and a cathode active material layer 32 have a thickness of preferably 2 μm to 100 μm, more preferably 5 μm to 50 μm, further preferably 5 μm to 20 μm. A thickness in excess of 100 μm is unpreferable in view of deterioration in rate characteristic, and sheet formability. The thickness of the plate-like particle 15b2 for cathode active material is desirably 2 μm or greater. A thickness less than 2 μm is unpreferable in view of the effect of increasing the filling rate being small.

The aspect ratio of the plate-like particle 15b2 for cathode active material is desirably 4 to 20. At an aspect ratio less than 4, the effect of expanding a lithium ion gateway plane through orientation becomes small. At an aspect ratio in excess of 20, when the plate-like particles 15b2 for cathode active material are filled into the cathode active material layer 15b such that the plate surfaces of the plate-like particles 15b2 for cathode active material are in parallel with an in-plane direction of the cathode active material layer 15b, a lithium ion diffusion path in the thickness direction of the cathode active material layer 15b becomes long, resulting in a deterioration in rate characteristic; thus, the aspect ratio is unpreferable.

In the full solid type lithium secondary cell 20 having the above-mentioned configuration, the proportion of the exposure (contact) of the (003) plane, through which lithium ions cannot be intercalated and deintercalated, to the solid electrolyte layer 23 becomes extremely low. Namely, unlike conventional configurations as disclosed in Japanese Patent Application Laid-Open (kokai) No. 2003-132887, in the lithium secondary cell 20, almost the entire surface (plate surface) of the cathode active material layer 22 opposing (contacting) the solid electrolyte layer 23 correspond to the lithium ion gateway plane (for example (104) plane).

Accordingly, in accordance with the present embodiment, in the full solid type lithium secondary cell 20, a much higher capacity and higher rate property can be achieved.

In addition, during the formation of the cathode active material layer 22 in the lithium secondary cell 20 having such a configuration, the crushing step in the above-mentioned embodiment is not carried out. Namely, lithium is introduced into the $Co_3O_4$ ceramic sheet obtained by firing the green sheet without crushing the same.

As compared with a liquid type having the risk of liquid leakage, the polymer-type lithium secondary battery 30 is characterized in that a thin cell configuration is possible. The film-like cathode active material layer 32 of the present embodiment achieves substantially a filling rate of 100% while planes through which lithium ions are intercalated and deintercalated are arrayed over the entire film surface. That is, as compared with conventional practices, the positive electrode portion can be rendered very thin, and a thinner cell can be implemented.

<Modifications>

The above-described embodiment and specific examples are, as mentioned above, mere examples of the best mode of the present invention which the applicant of the present invention contemplated at the time of filing the present application. The above-described embodiment and specific examples should not be construed as limiting the invention. Various modifications to the above-described embodiment and specific examples are possible, so long as the invention is not modified in essence.

Several modifications will next be exemplified. In the following description of the modifications, component members similar in structure and function to those of the above-described embodiment are denoted by names and reference numerals similar to those of the above-described embodiment. The description of the component members appearing in the above description of the embodiment can be applied as appropriate, so long as no inconsistencies are involved.

Needless to say, even modifications are not limited to those described below. Limitingly construing the present invention based on the above-described embodiment and the following modifications impairs the interests of an applicant (particularly, an applicant who is motivated to file as quickly as possible under the first-to-file system) while unfairly benefiting imitators, and is thus impermissible.

The structure of the above-described embodiment and the structures of the modifications to be described below are entirely or partially applicable in appropriate combination, so long as no technical inconsistencies are involved.

The present invention is not limited to the structure which is specifically disclosed in the description of the above embodiment.

For example, the cathode active material layer 15b shown in FIG. 1B may be a film-like $LiCoO_2$ ceramic sheet (cathode active material film) as the cathode active material layer 22 shown in FIG. 2 or the cathode active material layer 32 shown in FIG. 3. In addition, the cathode active material layer 22 shown in FIG. 2 and the cathode active material layer 32 shown in FIG. 3 may be divided into a plurality of regions. That is, the cathode active material layer 22 shown in FIG. 2 and the cathode active material layer 32 shown in FIG. 3 may be configured by arraying thin film-like $LiCoO_2$ ceramic sheet as well.

As an electrolyte, an inorganic solid, an organic polymer, or a gel formed by impregnating an organic polymer with an electrolytic solution can be used.

In the above-mentioned examples, the cathode active material layer 22 was applied to a full-solid-type cell. Nevertheless, the present invention can also be applied to a liquid-type cell. Usually, material for a positive electrode of a liquid-type cell is filled with an active material at a filling rate of about 60%. By contrast, the active material film of the present invention achieves substantially a filling rate of 100% while lithium ion gateway planes are arrayed over the entire film surface. That is, while the sacrifice of rate characteristic is minimized, a very high capacity is attained.

The cathode active material layer 22 and the cathode collector 21 may be merely in contact with each other at the interface therebetween or may be bonded together by means of a thin layer of an electrically conductive binder, such as acetylene black. In the latter case, bending of the cathode collector 21 may cause cracking in the cathode active material layer 22. Nevertheless, such a crack is in parallel with the direction of conduction of electrons and ions. Thus, the occurrence of cracking does not raise any problem with respect to characteristics.

Figure 9:
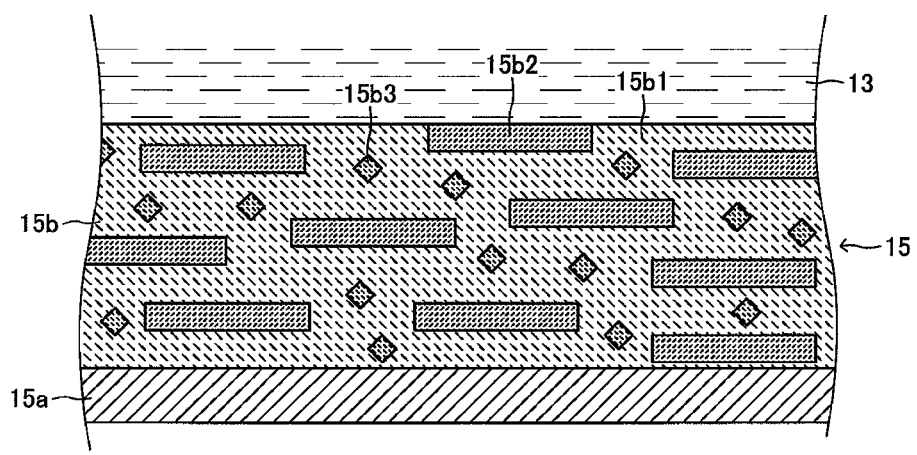
FIG. 9 is a sectional view of the structure of a modification of the positive electrode shown in FIG. 1B.

Plate-like particles of a plurality of sizes and shapes may be blended as appropriate in the cathode active material layer 15b. As shown in FIG. 9, the plate-like particles 15b2 for cathode active material of the present invention and conventional isometric particles 15b3 may be combined at an appropriate mixing ratio. By means of mixing, at an appropriate mixing ratio, isometric conventional particles 15b3 and the plate-like particles 15b2 for cathode active material having a thickness substantially equivalent to the particle size of the isometric particle, the particles can be efficiently arrayed, whereby the filling rate can be raised.

Figure 10A:
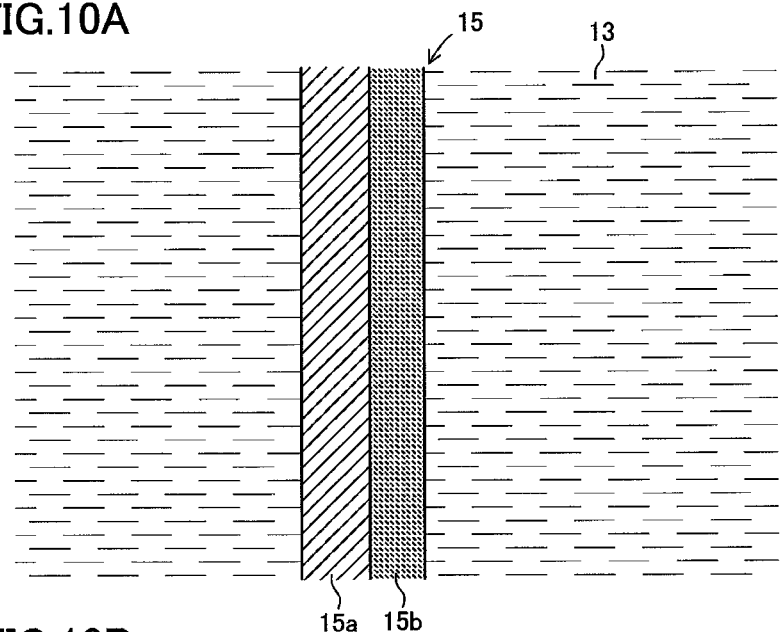
FIG. 10A is a sectional view of the structure of a modification of the positive electrode shown in FIG. 1B.
Figure 10B:
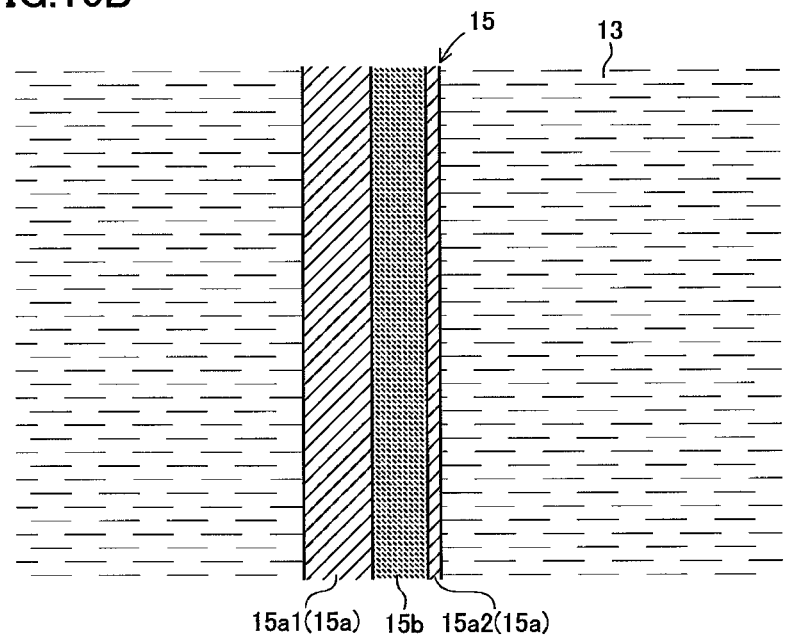
FIG. 10B is a sectional view of the structure of a modification of the positive electrode shown in FIG. 1B.

As mentioned above, when the cathode active material layer 15b is a self-standing-film-like ceramic sheet (cathode active material film), the cathode collector 15a may be provided on only one of the plate surfaces of the cathode active material layer 15b as shown in FIG. 10A, and may be provided on both plate surfaces of the cathode active material layer 15b as shown in FIG. 10B.

When the cathode collector 15a is provided on both plate surfaces of the cathode active material layer 15b as shown in FIG. 10B, one of the cathode current collectors, i.e. the cathode collector 15a1, may be formed thicker than the other cathode collector 15a2 in order to support the self-standing film-like cathode active material layer 15b. In addition, in this case, the other positive electrode collector 15a2 is formed as to have a structure (mesh-like, porous or the like) not to inhibit the intercalation and deintercalation of lithium ions in the self-standing film-like cathode active material layer 15b. Further, the cathode collector 15a2 is applicable to the positive electrode 15 shown in FIG. 1B as well.

When the cathode collector 15a is provided on only one of the plate surfaces of the cathode active material layer 15b as shown in FIG. 10A, during the cell reactions in the positive electrode 15 on charging and discharging, the direction of the movement of lithium ions and that of electrons become converse, and thus an electric potential gradient occurs within the cathode active material layer 15b. When the electric potential gradient increases, lithium ions become difficult to diffuse.

By contrast, when the cathode collector 15a2 not inhibiting the intercalation and deintercalation of lithium ions is provided on the surface contacting the electrolyte 13 in the self-standing film-like cathode active material layer 15b as shown in FIG. 10B, the formation of electric potential gradient as described above is suppressed. Thus, the cell performance is improved.

Material used to form the plate-like particle for cathode active material and the cathode active material film of the present invention is not limited to lithium cobaltate, so long as the material has a layered rock salt structure. For example, the plate-like particle for cathode active material and the cathode active material film of the present invention can be formed from a solid solution which contains nickel, manganese, etc., in addition to cobalt. Specific examples of such a solid solution include lithium nickelate, lithium manganate, lithium nickelate manganate, lithium nickelate cobaltate, lithium cobaltate nickelate manganate, and lithium cobaltate manganate. These materials may contain one or more elements of Mg, Al, Si, Ca, Ti, V, Cr, Fe, Cu, Zn, Ga, Ge, Sr, Y, Zr, Nb, Mo, Ag, Sn, Sb, Te, Ba, Bi, etc.

At a temperature of 920° C. or higher, an oxide of Co is phase-transformed from a spinel structure represented by $Co_3O_4$ at room temperature to a rock salt structure represented by CoO. Meanwhile, Mn and Ni assume a spinel structure represented by $Mn_3O_4$ and a rock salt structure represented by NiO, respectively, over a wide range of temperature.

Thus, as in the case of Co, a solid solution which contains at least two of Co, Ni, and Mn can be phase-transformed from a spinel structure at low temperature to a rock salt structure at high temperature through control of composition, temperature, atmosphere, pressure, etc.

In this case, there can be yielded, by the following procedure, an $LiMO_2$ sheet or plate-like particles for cathode active material in which the lithium ion gateway plane, such as (104) and (101), is oriented in parallel with the plate surface: an independent film-like sheet composed of a large number of (h00)-oriented plate-like $M_3O_4$ (M includes at least one selected from among Co, Ni, and Mn) grains is formed, and then lithium is introduced into the sheet or pieces obtained by crushing the sheet.

That is, for example, even an Ni—Mn composite oxide, which does not contain Co, assumes a rock salt structure at high temperature and a spinel structure at low temperature as in the case of a Co oxide; thus, the Ni—Mn composite oxide can be used to form an oriented sheet in a manner similar to that mentioned above. By introducing lithium into the thus-formed sheet or pieces obtained by crushing the sheet, there can be manufactured a favorably oriented cathode active material represented by $Li(Ni,Mn)O_2$.

Alternatively, there can be yielded, by the following procedure, an $LiMO_2$ sheet or plate-like particles for cathode active material in which the lithium ion gateway plane, such as (104) or (101), is oriented in parallel with the plate surface: an independent film-like sheet composed of a large number of (h00)-oriented plate-like MO (M includes at least one selected from among Co, Ni, and Mn) grains having a rock salt structure is formed, and then lithium is introduced into the sheet or pieces obtained by crushing the sheet.

Alternatively, an $LiMO_2$ sheet or plate-like particles for cathode active material in which the lithium ion gateway plane, such as (104) and (101), is oriented in parallel with the plate surface, can be yielded directly by means of controlling composition, temperature, atmosphere, pressure, additive, etc. when a film-like sheet composed of $LiMO_2$ (M includes at least one selected from among Co, Ni, and Mn) particles is sintered.

Also, in a cathode active material having an olivine structure as typified by $LiFePO_4$, b-axis direction ([010] direction) is regarded as the direction of lithium ion conduction. Thus, by means of forming plate-like particles or a film in which ac plane (e.g., the (010) plane) is oriented in parallel with the plate surface, a cathode active material having good performance can be yielded.

Another Example Composition 1

Cobalt-Nickel System

There is formed a green sheet which has a thickness of 20 μm or less and contains an NiO powder, a $Co_3O_4$ powder, and $Al_2O_3$ powder. The green sheet is atmospherically-sintered at a temperature which falls within a range of 1,000° C. to 1,400° C. for a predetermined time, thereby yielding an independent film-like sheet composed of a large number of (h00)-oriented plate-like (Ni, Co, Al)O grains. By means of adding additives, such as $MnO_2$ and ZnO, grain growth is accelerated, resulting in enhancement of (h00) orientation of plate-like crystal grains.

The (h00)-oriented (Ni, Co, Al)O ceramic sheet yielded in the above-mentioned process and lithium nitrate ($LiNO_3$) are mixed, followed by heating for a predetermined time, whereby lithium is introduced into the (Ni, Co, Al)O grains. Thus is yielded a (104)-oriented $Li(Ni_{0.75}Co_{0.2}Al_{0.05})O_2$ plate-like sheet for cathode active material.

In the above-mentioned examples, a portion of nickel in a cobalt-nickel system is substituted with aluminum. However, the present invention is not limited thereto. Needless to say, the present invention can also be favorably applied to $Li(Ni,Co)O_2$.

Another Composition Example 2

Cobalt-Nickel-Manganese 3-Element System

There is formed, by the following method, an independent film-like sheet composed of grains oriented such that the (101) or (104) planes are in parallel with the plate surface of grain: a green sheet having a thickness of 100 μm or less is formed by use of an $Li(Ni_{1/3}Mn_{1/3}Co_{1/3})O_2$ powder, and the green sheet is sintered at a temperature falling within a range of 900° C. to 1,200° C. for a predetermined time.

The specifics of reason why the process yields oriented grains are not clear. However, an assumed reason is as follows. When the green sheet is sintered, only those particles whose crystal faces having the lowest crystal strain energy are present within the plane of the green sheet selectively undergo in-plane flat (plate-like) grain growth. As a result, there is yielded plate-like crystal grains of $Li(Ni_{1/3}Mn_{1/3}Co_{1/3})O_2$ which have high aspect ratio and in which particular crystal faces (herein, the (101) and (104) planes) are oriented in parallel with the plate surface.

Herein, the strain energy refers to internal stress in the course of grain growth and stress associated with defect or the like. A layer compound is generally known to have high strain energy.

Both of strain energy and surface energy contribute to selective grain growth (preferred orientation) of grains oriented in a particular direction. The (003) plane is most stable with respect to surface energy, whereas the (101) and (104) planes are stable with respect to strain energy.

At a film thickness of 0.1 μm or less, the ratio of surface to sheet volume is high; thus, selective growth is subjected to surface energy, thereby yielding (003)-plane-oriented grains. Meanwhile, at a film thickness of 0.1 μm or greater, the ratio of surface to sheet volume lowers; thus, selective growth is subjected to strain energy, thereby yielding (101)-plane- and (104)-plane-oriented grains. However, a sheet having a film thickness of 100 μm or greater encounters difficulty in densification. Thus, internal stress is not accumulated in the course of grain growth, so that selective orientation is not confirmed.

At a temperature of 1,000° C. or higher, at which grain growth is accelerated, the present material suffers volatilization of lithium and decomposition due to structural instability. Thus, it is important, for example, to excessively increase the lithium content of material for making compensation for volatilizing lithium, to control atmosphere (for example, in sintering within a closed container which contains a lithium compound, such as lithium carbonate) for restraining decomposition, and to perform low-temperature sintering through addition of additives, such as $Bi_2O_3$ and low-melting-point glass.

The film-like sheet yielded in the above-mentioned sheet formation step is in such a state that the sheet is apt to break at grain boundaries. Thus, the film-like sheet yielded in the above-mentioned sheet formation step is placed on a mesh having a predetermined mesh size, and then a spatula is pressed against the sheet from above, whereby the sheet is crushed into a large number of $Li(Ni_{1/3}Mn_{1/3}Co_{1/3})O_2$ particles.

Alternatively, plate-like crystal grains of $Li(Ni_{1/3}Mn_{1/3}Co_{1/3})O_2$ can also be yielded by the following manufacturing method.

There is formed a green sheet which has a thickness of 20 μm or less and contains an NiO powder, an $MnCO_3$ powder, and a $Co_3O_4$ powder. The green sheet is sintered in an Ar atmosphere at a temperature which falls within a range of 900° C. to 1,300° C. for a predetermined time, thereby yielding an independent film-like sheet composed of a large number of (h00)-oriented plate-like $(Ni,Mn,Co)_3O_4$ grains. In the course of the sintering, $(Ni,Mn,Co)_3O_4$ having a spinel structure is phase-transformed to (Ni,Mn,Co)O having a rock salt structure through reduction.

At this time, only those particles whose crystal faces having the lowest surface energy are present within the plane of the green sheet selectively undergo in-plane flat (plate-like) grain growth. As a result, sintering the sheet yields plate-like crystal grains of (Ni,Mn,Co)O which have high aspect ratio and in which particular crystal faces (herein, the (h00) planes) are oriented in parallel with the plate surface of the grain.

In the process of temperature lowering, through replacement of the atmosphere within the furnace with an oxygen atmosphere, (Ni,Mn,Co)O is oxidized into $(Ni,Mn,Co)_3O_4$.

At this time, the orientation of (Ni,Mn,Co)O is transferred, thereby yielding plate-like crystal grains of $(Ni,Mn,Co)_3O_4$ in which particular crystal faces (herein, the (h00) planes) are oriented in parallel with the plate surface of the grain.

In the oxidation from (Ni,Mn,Co)O to $(Ni,Mn,Co)_3O_4$, the degree of orientation is apt to deteriorate for the following reason: since (Ni,Mn,Co)O and $(Ni,Mn,Co)_3O_4$ differ greatly in crystal structure and Ni—O, Mn—O, and Co—O interatomic distances, oxidation (i.e., insertion of oxygen atoms) is apt to be accompanied by a disturbance of crystal structure.

Thus, preferably, conditions are selected as appropriate so as to avoid deterioration in the degree of orientation to the greatest possible extent. For example, reducing the temperature-lowering rate, holding at a predetermined temperature, and reducing the partial pressure of oxygen are preferred.

The film-like sheet yielded in the above-mentioned sheet formation step is in such a state that the sheet is apt to break at grain boundaries. Thus, the film-like sheet yielded in the above-mentioned sheet formation step is placed on a mesh having a predetermined mesh size, and then a spatula is pressed against the sheet from above, whereby the sheet is crushed into a large number of $(Ni,Mn,Co)_3O_4$ particles.

The (h00)-oriented $(Ni,Mn,Co)_3O_4$ particles yielded in the above-mentioned crushing step and $Li_2CO_3$ are mixed. The resultant mixture is heated for a predetermined time, whereby lithium is intercalated into the $(Ni,Mn,Co)_3O_4$ particles. Thus, there is yielded (104)-oriented $Li(Ni_{1/3}Mn_{1/3}Co_{1/3})O_2$; i.e., the plate-like particles 15$b$2 for cathode active material.

Although the ratio Li/Co is not limited to 1.0, it falls preferably within a range of 0.9 to 1.2, more preferably within a range of 1.0 to 1.1. Thus, good charge-discharge characteristics can be realized.

For example, by adding $Li_2CO_3$ powder at Li/Co of more than 1.0 (e.g., 1.2) in the above-described Example 1 and Example 2, or by mixing (Ni,Co,Al)O ceramic sheet with $LiNO_3$ powder at a large mole fraction Li/(NiCoAl) (e.g., 2.0) in the above-described cobalt-nickel system compositional example, plate-like particles or film of cathode active material having lithium-excess composition can be obtained.

The Li/Co value in the particles or film of cathode active material having lithium-excess composition can be determined by componental analysis using an ICP (Inductively Coupled Plasma) emission spectrophotometer (product name: ULTIMA2, product of HORIBA, Ltd.).

Specifically, for example, powdery $LiCoO_2$ was manufactured by a method similar to that in the above-described Example 1 except that the ratio Li/Co was 1.2 when sprinkling $LiNO_3$ powder (product of Kanto Chemical Co., Inc.) on $Co_3O_4$ ceramic sheet. Extra lithium compound was removed by washing treatment of the resultant powdery $LiCoO_2$. Thereafter, by componental analysis using the above-described ICP emission spectrophotometer, it was revealed that Li/Co=1.1. In addition, an XRD measurement (evaluation of the orientation) showed that X-ray diffraction intensity ratio [003]/[104]=0.3. Further, by means of a transmission electron microscopy, it was confirmed that, in the powdery $LiCoO_2$ plate-like particles thus obtained, a plurality of (four) layered regions (domains) are stacked together in the thickness direction and the individual layered region was formed as a configuration in which crystallites having the singular crystal axis are densely joined together. By contrast, a similar componental analysis of the powdery $LiCoO_2$ manufactured in the above-described Example 1 revealed that Li/Co=1.0.

The present invention is not limited to the manufacturing methods disclosed specifically in the description of the above-described embodiment.

For example, the sintering temperature for the green sheet may be a temperature falling within a range of 900° C. to 1,300° C. Also, the additive used in the sheet formation step is not limited to $Bi_2O_3$.

Further, in place of the material particles of $Co_3O_4$ used in the above-described specific examples, material particles of CoO can be used. In this case, sintering a slurry yields, in a temperature range of 900° C. or higher, a (h00)-oriented CoO sheet having a rock salt structure. Oxidizing the CoO sheet, for example, at about 800° C. or lower yields a sheet composed of (h00)-oriented $Co_3O_4$ particles having a spinel structure, the array of Co atoms and O atoms in CoO being partially transferred to the $Co_3O_4$ particles.

In the lithium introduction step, in place of merely mixing the (h00)-oriented $Co_3O_4$ particles and $Li_2CO_3$, followed by heating for a predetermined time, the (h00)-oriented $Co_3O_4$ particles and $Li_2CO_3$ may be mixed and heated in flux, such as sodium chloride (melting point: 800° C.) or potassium chloride (melting point: 770° C.).

Needless to say, those modifications which are not particularly referred to are also encompassed in the technical scope of the present invention, so long as the invention is not modified in essence.

Those components which partially constitute means for solving the problems to be solved by the present invention and are illustrated with respect to operations and functions encompass not only the specific structures disclosed above in the description of the above embodiment and modifications but also any other structures that can implement the operations and functions. Further, the contents (including specifications and drawings) of the prior application and publications cited herein can be incorporated herein as appropriate by reference.

The invention claimed is:

1. A lithium secondary battery comprising:
a positive electrode which contains a plate-like particle having a layered rock salt structure as a cathode active material, wherein a lithium ion gateway plane is oriented in parallel with a plate surface, which is a surface orthogonal to a thickness direction of the particle and thus exposed at the plate surface, a plurality of layers are stacked together in the thickness direction, each of the layers has a plurality of crystallites densely joined together, each crystallite within a given layer has the same crystal axis in the thickness direction but has a different crystal axis in a direction perpendicular to the thickness direction, and each layer in the thickness direction has a dimension of 0.2-5 μm;
a negative electrode which contains a carbonaceous material or a lithium-occluding material as an anode active material; and
an electrolyte provided so as to intervene between the positive electrode and the negative electrode.

2. A lithium secondary battery according to claim 1, wherein, in each of the layers, [h'k'l'] axes different from a [hkl] axis which is a crystal axis parallel with the thickness direction are oriented in a plurality of directions.

3. A lithium secondary battery according to claim 1, wherein a (104) plane is oriented in parallel with the plate surface so as to expose at the plate surface, and
the particle has a ratio of intensity of diffraction by a (003) plane to intensity of diffraction by the (104) plane, [003]/[104], as obtained by X-ray diffraction of 1 or less.

4. A lithium secondary battery according to claim 1, wherein a porosity is 10% or less.

5. A lithium secondary battery comprising:
- a positive electrode which includes a cathode active material film having a layered rock salt structure, wherein a lithium ion gateway plane is oriented in parallel with a plate surface, which is a surface orthogonal to a thickness direction of the film and thus exposed at the plate surface, a plurality of layers are stacked together in the thickness direction, and each of the layers has a plurality of crystallites densely joined together, each crystallite within a given layer has the same crystal axis in the thickness direction but has a different crystal axis in a direction perpendicular to the thickness direction, and each layer in the thickness direction has a dimension of 0.2-5 μm;
- a negative electrode which contains a carbonaceous material or a lithium-occluding material as an anode active material; and
- an electrolyte provided so as to intervene between the positive electrode and the negative electrode.

6. A lithium secondary battery according to claim 5, wherein, in each of the layers, [h'k'l'] axes different from a [hkl] axis which is a crystal axis parallel with the thickness direction are oriented in a plurality of directions.

7. A lithium secondary battery according to claim 5, wherein a (104) plane is oriented in parallel with the plate surface so as to expose at the plate surface, and
- the particle has a ratio of intensity of diffraction by a (003) plane to intensity of diffraction by the (104) plane, [003]/[104], as obtained by X-ray diffraction of 1 or less.

8. A lithium secondary battery according to claim 5, wherein a porosity is 10% or less.

* * * * *